US012748534B2

(12) United States Patent
Yang

(10) Patent No.: US 12,748,534 B2
(45) Date of Patent: Sep. 29, 2026

(54) METHOD FOR PERFORMING DATA PROTECTION CONTROL OF MEMORY DEVICE WITH AID OF SELECTIVE SOFT-BIT TRANSMISSION, AND ASSOCIATED APPARATUS

(71) Applicant: Silicon Motion, Inc., Hsinchu County (TW)

(72) Inventor: Tsung-Chieh Yang, Hsinchu City (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 19/198,140

(22) Filed: May 5, 2025

(65) Prior Publication Data

US 2026/0111127 A1 Apr. 23, 2026

Related U.S. Application Data

(60) Provisional application No. 63/711,145, filed on Oct. 23, 2024.

(51) Int. Cl.
*G06F 12/00* (2006.01)
*G06F 3/06* (2006.01)

(52) U.S. Cl.
CPC .......... *G06F 3/0622* (2013.01); *G06F 3/0659* (2013.01); *G06F 3/0679* (2013.01)

(58) Field of Classification Search
CPC .... G06F 3/0622; G06F 3/0659; G06F 3/0679; G06F 21/78; G06F 21/64; G11C 16/08; G11C 16/34
USPC .......................................................... 711/163
See application file for complete search history.

(56) References Cited

U.S. PATENT DOCUMENTS

2017/0269993 A1 9/2017 Maffeis
2018/0059933 A1* 3/2018 Helmick ............... G06F 3/0683
2018/0059943 A1* 3/2018 Lueker-Boden ...... G06F 3/0611
2019/0286516 A1 9/2019 Jacobvitz

FOREIGN PATENT DOCUMENTS

CN 107146638 A 9/2017
CN 108073105 A * 5/2018 ......... G05B 19/0421
DE 102017112446 A1 * 3/2018 .......... G06F 11/1048
TW 202322134 A 6/2023
TW 202439117 A 10/2024

* cited by examiner

*Primary Examiner* — Mardochee Chery
(74) *Attorney, Agent, or Firm* — Winston Hsu

(57) ABSTRACT

A method for performing data protection control of a memory device with aid of selective soft-bit transmission and associated apparatus are provided, where the memory device may include a memory controller and a non-volatile (NV) memory. The method may include: sending at least one read command as well as a controller-side indication, the controller-side indication for selectively enabling the selective soft-bit transmission at the NV memory, to the NV memory for obtaining soft-decoding information regarding a first page within a first block among the plurality of blocks, wherein the first page is arranged to store first data; and receiving the soft-decoding information as well as a memory-side indication from the NV memory, wherein the memory-side indication at a first cycle is arranged to indicate whether the NV memory is going to transmit at least one soft bit at a second cycle, the second cycle coming after the first cycle.

19 Claims, 14 Drawing Sheets

METHOD FOR PERFORMING DATA PROTECTION CONTROL OF MEMORY DEVICE WITH AID OF SELECTIVE SOFT-BIT TRANSMISSION, AND ASSOCIATED APPARATUS

CROSS REFERENCE TO RELATED APPLICATIONS

This application claims the benefit of U.S. Provisional Application No. 63/711,145, filed on Oct. 23, 2024. The content of the application is incorporated herein by reference.

BACKGROUND OF THE INVENTION

1. Field of the Invention

The present invention is related to memory control, and more particularly, to a method for performing data protection control of a memory device with aid of selective soft-bit transmission, and associated apparatus.

2. Description of the Prior Art

A memory device may comprise flash memory for storing data, and the management of accessing the flash memory is complicated. For example, the memory device may be a memory card, a solid state drive (SSD), or an embedded storage device such as that conforming to Universal Flash Storage (UFS) specification. The memory device may be arranged to store various files such as system files, user files, etc. in a file system of a host. In order to guarantee the correctness of the data read from the flash memory, there may be multiple types of data protection processing, and the overall performance may degrade when more than one type of data protection processing is triggered during reading the data from the flash memory. Thus, a novel method and associated architecture are needed for solving the problems without introducing any side effect or in a way that is less likely to introduce a side effect.

SUMMARY OF THE INVENTION

It is an objective of the present invention to provide a method for performing data protection control of a memory device with aid of selective soft-bit transmission, and associated apparatus, in order to solve the above-mentioned problems.

At least one embodiment of the present invention provides a method for performing data protection control of a memory device with aid of selective soft-bit transmission, where the method can be applied to a memory controller of the memory device. The memory device may comprise the memory controller and a non-volatile (NV) memory, the NV memory may comprise at least one NV memory element (e.g., one or more NV memory elements), and the aforementioned at least one NV memory element may comprise a plurality of blocks. The method may comprise: sending at least one read command as well as a controller-side indication, the controller-side indication for selectively enabling the selective soft-bit transmission at the NV memory, to the NV memory for obtaining soft-decoding information regarding a first page within a first block among the plurality of blocks, wherein the first page is arranged to store first data; and receiving the soft-decoding information as well as a memory-side indication from the NV memory, for performing soft-decoding according to the soft-decoding information to obtain the first data from the soft-decoding, wherein the memory-side indication at a first cycle is arranged to indicate whether the NV memory is going to transmit at least one soft bit at a second cycle, the second cycle coming after the first cycle.

In addition to the above method, the present invention also provides a memory controller for performing data protection control of a memory device with aid of selective soft-bit transmission, where the memory device comprises the memory controller and an NV memory, the NV memory may comprise at least one NV memory element (e.g., one or more NV memory elements), and the aforementioned at least one NV memory element may comprise a plurality of blocks. In addition, the memory controller comprises a processing circuit that is arranged to control the memory controller according to a plurality of host commands from a host device, to allow the host device to access the NV memory through the memory controller. More particularly, the memory controller is arranged to send at least one read command as well as a controller-side indication, the controller-side indication for selectively enabling the selective soft-bit transmission at the NV memory, to the NV memory for obtaining soft-decoding information regarding a first page within a first block among the plurality of blocks, wherein the first page is arranged to store first data; and the memory controller is arranged to receive the soft-decoding information as well as a memory-side indication from the NV memory, for performing soft-decoding according to the soft-decoding information to obtain the first data from the soft-decoding, wherein the memory-side indication at a first cycle is arranged to indicate whether the NV memory is going to transmit at least one soft bit at a second cycle, the second cycle coming after the first cycle.

In addition to the method mentioned above, the present invention also provides the memory device comprising the memory controller mentioned above, wherein the memory device comprises: the NV memory, configured to store information; and the memory controller, coupled to the NV memory, configured to control operations of the memory device.

In addition to the method mentioned above, the present invention also provides an electronic device comprising the memory device mentioned above, wherein the electronic device further comprises the host device that is coupled to the memory device. The host device may comprise: at least one processor, arranged for controlling operations of the host device; and a power supply circuit, coupled to the at least one processor, arranged for providing power to the at least one processor and the memory device. In addition, the memory device provides the host device with storage space.

According to some embodiments, the apparatus may comprise at least one portion (e.g., a portion or all) of the electronic device. For example, the apparatus may comprise the memory controller within the memory device. In another example, the apparatus may comprise the memory device. In yet another example, the apparatus may comprise the electronic device.

The method of the present invention and the associated apparatus can guarantee that the memory device can operate properly in various situations. For example, the memory controller within the memory device can operate according to at least one control scheme (e.g., one or more control schemes) of the method to perform associated operations, and more particularly, can control the NV memory to selectively transmit a small portion of soft bits among a plurality of soft bits, rather than transmitting all of the plurality of soft bits, and use a predetermined indication signal (e.g., any signal among at least one predetermined signal between the memory controller and the NV memory) as a hint regarding the selective soft-bit transmission, to enhance the overall performance. In addition, the method of the present invention and the associated apparatus can solve the related art problems without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
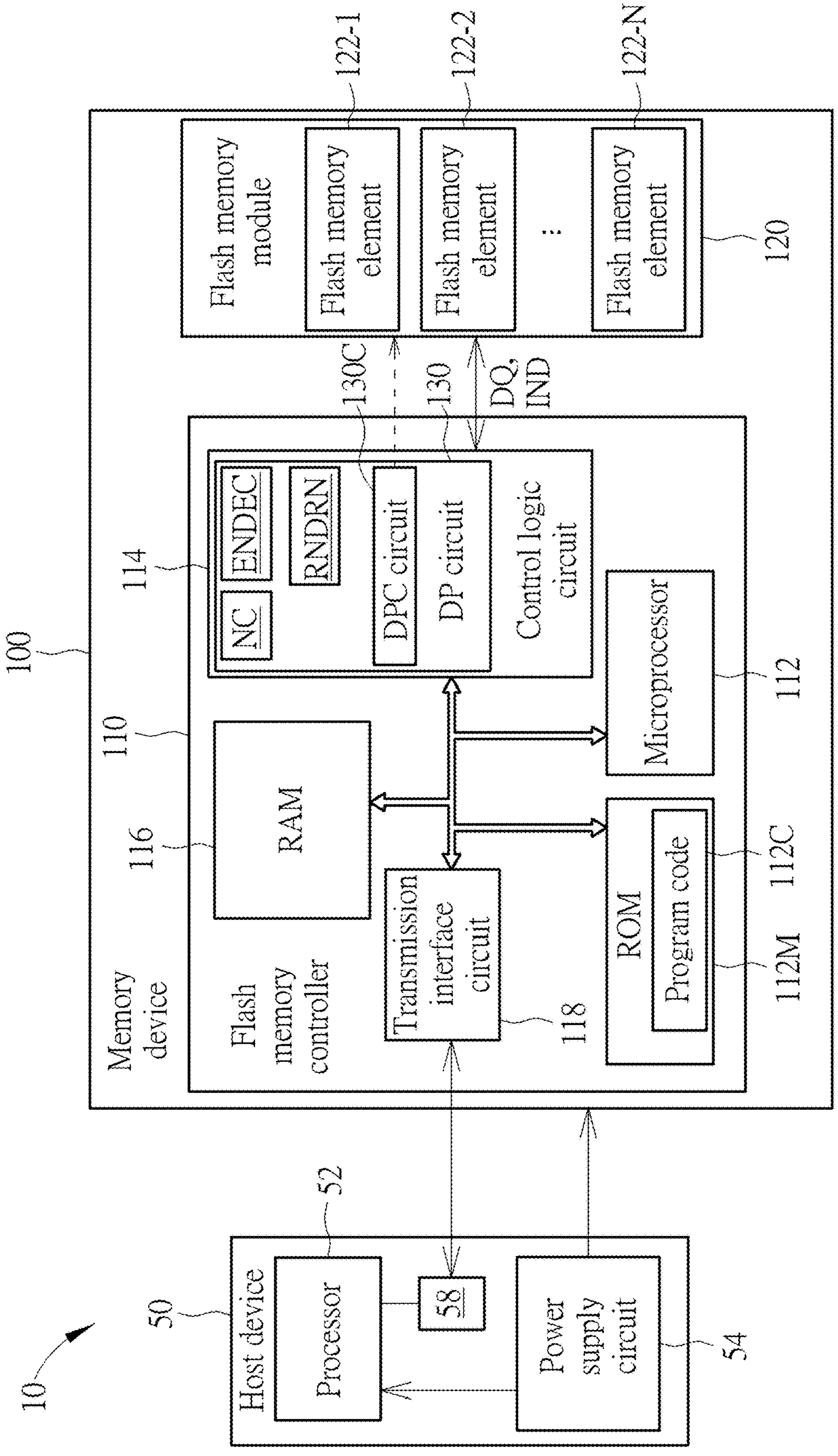
FIG. 1 is a diagram of an electronic device according to an embodiment of the present invention, where the architecture shown in FIG. 1 can operate according to a method for performing data protection control of a memory device with the aid of selective soft-bit transmission.

FIG. 1 is a diagram of an electronic device 10 according to an embodiment of the present invention, where the architecture shown in FIG. 1 can operate according to a method for performing data protection control of a memory device such as the memory device 100 with the aid of selective soft-bit transmission. Regarding the architecture shown in FIG. 1, the electronic device 10 may comprise a host device 50 and the memory device 100. The host device 50 may comprise at least one processor (e.g., one or more processors) which may be collectively referred to as the processor 52, and may further comprise a power supply circuit 54 coupled to the processor 52. The processor 52 is arranged for controlling operations of the host device 50, and the power supply circuit 54 is arranged for providing power to the processor 52 and the memory device 100, and outputting one or more driving voltages to the memory device 100. The memory device 100 may be arranged for providing the host device 50 with storage space, and obtaining the one or more driving voltages from the host device 50 as power source of the memory device 100. Examples of the host device 50 may include, but are not limited to: a multifunctional mobile phone, a wearable device, a tablet computer, a personal computer such as a desktop computer and a laptop computer. Examples of the memory device 100 may include, but are not limited to: a solid state drive (SSD), and various types of embedded memory devices such as that conforming to Peripheral Component Interconnect Express (PCIe) specification, etc. According to this embodiment, the memory device 100 may comprise a memory controller such as a flash memory controller 110, and may further comprise an NV memory such as a flash memory, and the flash memory may be implemented as a flash memory module 120, where the flash memory controller 110 is arranged to control operations of the memory device 100 and access the flash memory module 120, and the flash memory module 120 is arranged to store information. The NV memory such as the flash memory module 120 may comprise at least one NV memory element such as at least one flash memory element, in particular, a plurality of flash memory elements 122-1, 122-2 . . . and 122-N, where "N" may represent a positive integer that is greater than one. For example, the plurality of flash memory elements 122-1, 122-2 . . . and 122-N may be implemented by way of flash memory chips, flash memory dies, etc. According to some embodiments, the plurality of flash memory elements 122-1, 122-2 . . . and 122-N may be implemented as a plurality of flash memory dies that are packed, stacked and/or integrated into at least one flash memory chip (e.g., one or more flash memory chips), where any flash memory chip among the aforementioned at least one flash memory chip may comprise at least one flash memory dies among the plurality of flash memory dies.

As shown in FIG. 1, the flash memory controller 110 may comprise a processing circuit such as a microprocessor 112, a storage unit such as a read-only memory (ROM) 112M, a control logic circuit 114, a random-access memory (RAM) 116 and a transmission interface circuit 118, where the above components may be coupled to one another via a bus. The RAM 116 is implemented by a Static RAM (SRAM), but the present invention is not limited thereto. The RAM 116 may be arranged to provide the flash memory controller 110 with internal storage space. For example, the RAM 116 may be utilized as a buffer memory for buffering data. In addition, the ROM 112M of this embodiment is arranged to store a program code 112C, and the microprocessor 112 is arranged to execute the program code 112C to control the access of the flash memory module 120. In some examples, the program code 112C may be stored in the RAM 116 or any type of memory. Further, the control logic circuit 114 may be arranged to control the flash memory module 120, and may comprise a data protection (DP) circuit 130 (labeled "DP circuit" for brevity) for performing data protection processing operations. The data protection circuit 130 may comprise multiple sub-circuits such as a noise canceler NC, an encoder and decoder circuit ENDEC, a randomizer and de-randomizer circuit RNDRN, a data protection control circuit 130C (labeled "DPC circuit" for brevity) and other circuits. For example, the encoder and decoder circuit ENDEC may comprise an encoder and a decoder arranged to perform encoding and decoding operations, respectively, the randomizer and de-randomizer circuit RNDRN may comprise a randomizer and a de-randomizer arranged to perform randomizing and de-randomizing operations, respectively, and the noise canceler NC may be arranged to perform noise canceling operations, and more particularly, to cancel the noise due to cell-to-cell interference. The encoding and decoding operations of the encoder and the decoder within the encoder and decoder circuit ENDEC may comprise ECC encoding and ECC decoding, for protecting data and/or perform error correction for any sub-storage-unit of multiple sub-storage-units within a physical page, and comprise RAID encoding and RAID decoding, for protecting data and/or perform error correction for a physical page group such as a group of physical pages, where the multiple sub-storage-units may have a same size, such as a predetermined size smaller than that of the physical page, but the present invention is not limited thereto. For example, the encoding/decoding of the encoder and decoder circuit ENDEC may comprise low-density parity-check (LDPC) code encoding/decoding. Additionally, the data protection control circuit 130C may perform data protection control as overall control of the data protection processing operations to further protect data for one or more predetermined scenarios. For example, the data protection control may comprise controlling the memory device 100 (or the flash memory controller 110 thereof) to operate according to at least one control scheme (e.g., one or more control schemes) of the method to perform the associated operations.

The transmission interface circuit 118 may conform to one or more communications specifications among various communications specifications (e.g., Serial Advanced Technology Attachment (Serial ATA, or SATA) specification, Universal Serial Bus (USB) specification, Peripheral Component Interconnect (PCI) specification, Peripheral Component Interconnect Express (PCIe) specification, embedded Multi Media Card (eMMC) specification, and Universal Flash Storage (UFS) specification), and may perform communications with the host device 50 (or a corresponding transmission interface circuit therein such as the transmission interface circuit 58) according to the one or more communications specifications for the memory device 100. Similarly, the transmission interface circuit 58 may conform to the one or more communications specifications, and may perform communications with the memory device 100 (or the transmission interface circuit 118 therein) according to the one or more communications specification for the host device 50.

In this embodiment, the host device 50 may transmit host commands and corresponding logical addresses to the flash memory controller 110 to access the memory device 100. The flash memory controller 110 receives the host commands and the logical addresses, and translates the host commands into memory operating commands (which may be simply referred to as operating commands), and further controls the flash memory module 120 with the operating commands to perform reading, writing/programing, etc. on memory units (e.g., data pages) having physical addresses within the flash memory module 120, where the physical addresses can be associated with the logical addresses. When the flash memory controller 110 performs an erase operation on any flash memory element 122-*n* among the plurality of flash memory elements 122-1, 122-2 . . . and 122-N (in which "n" may represent any integer in the interval [1, N]), at least one block of multiple blocks of the flash memory element 122-*n* may be erased, where each block of the blocks may comprise multiple pages (e.g., data pages), and an access operation (e.g., a reading operation or a writing operation) may be performed on one or more pages.

As shown in FIG. 1, the data protection circuit 130 can be illustrated as being integrated into the control logic circuit 114, but the present invention is not limited thereto. According to some embodiments, the data protection circuit 130 can be implemented within a dedicated circuit outside the control logic circuit 114. For example, the dedicated circuit can be at least one digital signal processing (DSP) engine such as a single DSP engine.

Some implementation details regarding the internal control of the memory device 100 can be further described as follows. According to some embodiments, the flash memory controller 110 can record, maintain, and/or update management information in at least one table such as at least one temporary table (e.g. one or more temporary tables) in the RAM 116 and at least one non-temporary table (e.g. one or more non-temporary tables) in the flash memory module 120, where the aforementioned at least one temporary table can be collectively referred to as the temporary table, and the aforementioned at least one non-temporary table can be collectively referred to as the non-temporary table. The temporary table may comprise a temporary version of at least a portion (e.g. a part or all) of the non-temporary table. For example, the non-temporary table may comprise at least one logical-to-physical (L2P) address mapping table (e.g. one or more L2P address mapping tables), for recording mapping relationships between multiple logical addresses (e.g. logical block addresses (LBAs) indicating multiple logical blocks, and logical page addresses (LPAs) indicating multiple logical pages within any of the multiple logical blocks) and multiple physical addresses (e.g. physical block addresses (PBAs) indicating multiple physical blocks, and physical page addresses (PPAs) indicating multiple physical pages within any of the multiple physical blocks), and the temporary table may comprise a temporary version of at least one sub-table (e.g. one or more sub-tables) of the aforementioned at least one L2P address mapping table, where the flash memory controller 110 (e.g. the microprocessor 112) can perform bi-directional address translation between the host-side storage space (e.g. the logical addresses) of the host device 50 and the device-side storage space (e.g. the physical addresses) of the flash memory module 120 within the memory device 100, in order to access data for the host device 50.

In the flash memory module 120, when a block of any one of the flash memory elements 122-1, 122-2, . . . and 122-N serves as a single level cell (SLC) block, each of the physical pages within the block may correspond to one logical page, and each of the memory cells of the page may be configured to store only one bit. In addition, when a block of any one of the flash memory elements 122-1, 122-2, . . . and 122-N serves as a multiple level cell (MLC) block, each of the physical pages within the block may correspond to at least two logical pages, and each of the memory cells of the page may be configured to store at least two bits. More particularly, when a block of any one of the flash memory elements 122-1, 122-2, . . . and 122-N serves as a triple level cell (TLC) block, each of the physical pages within the block may correspond to three logical pages, and each of the memory cells of the page may be configured to store three bits; when a block of any one of the flash memory elements 122-1, 122-2, . . . and 122-N serves as a quadruple level cell (QLC) block, each of the physical pages within the block may correspond to four logical pages, and each of the memory cells of the page may be configured to store four bits; and the rest can be deduced by analogy.

Figure 2:
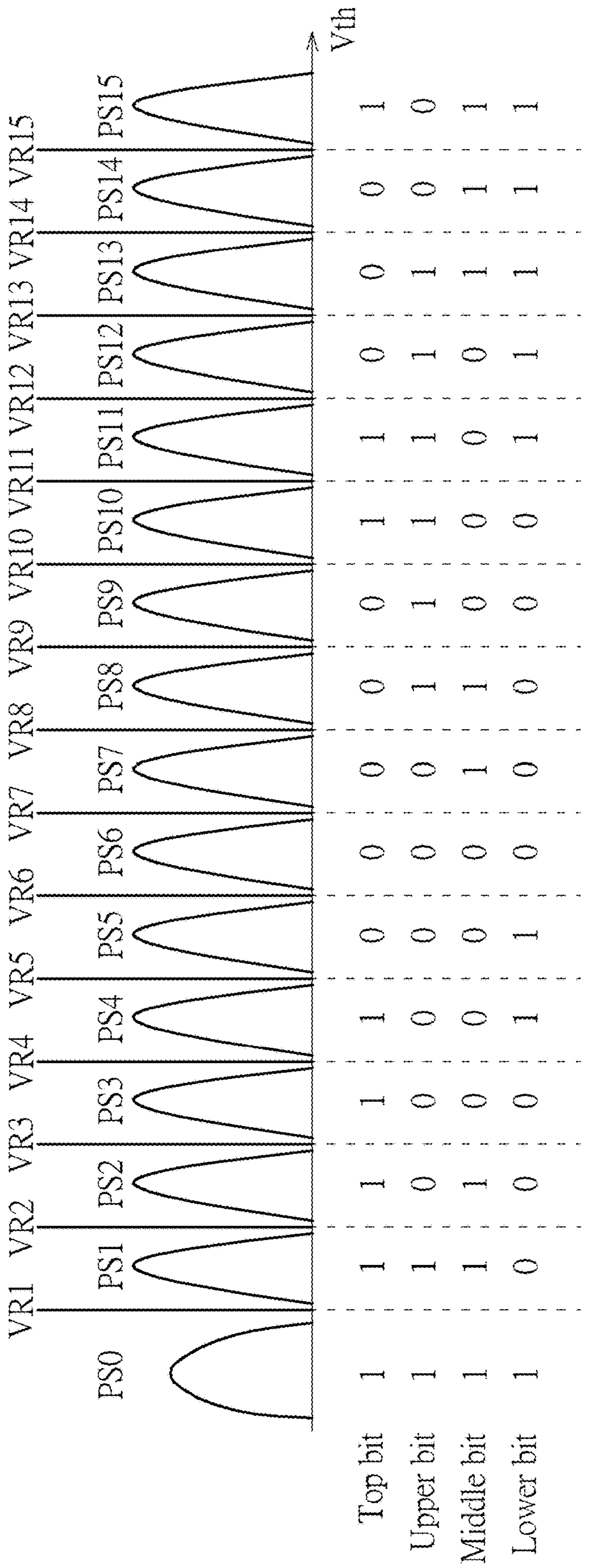
FIG. 2 is a diagram illustrating a storage control scheme of the method according to an embodiment of the present invention.

FIG. 2 is a diagram illustrating a storage control scheme of the method according to an embodiment of the present invention, where a plurality of states (e.g., program states) of a memory cell of the QLC block may be expressed with the curves for better comprehension, but the present invention is not limited thereto. The horizontal axis (labeled "Vth") may represent the read sensing voltage of the flash memory module 120, such as a threshold voltage for determining bit information during reading the flash memory module 120. The read sensing voltage can also be referred to as the read voltage for brevity. For example, the flash memory controller 110 can selectively perform one or more of the settings {Vth=VR1, Vth=VR2, . . . , Vth=VR15} to determine the bit information during reading the flash memory module 120.

As shown in FIG. 2, any memory cell of the QLC block may be arranged to have any state among sixteen states PS0, PS1 . . . and PS15, for example, by programing, and these states may represent different combinations of four bits that are named as a top bit, an upper bit, a middle bit and a lower bit. In the embodiment shown in FIG. 2, when the memory cell is arranged to have the state PS0, the top bit, the upper bit, the middle bit and the lower bit stored in the memory cell are (1, 1, 1, 1); when the memory cell is programed to have the state PS1, the top bit, the upper bit, the middle bit and the lower bit stored in the memory cell are (1, 1, 1, 0); and the rest can be deduced by analogy.

For example, when the top bit is required to be read by the flash memory controller 110, the flash memory controller 110 can control the flash memory module 120 to apply four read voltages VR5, VR10, VR12 and VR15 to read the memory cell. If the memory cell is conductive when the read voltage VR5 is applied, the top bit is determined to be "1"; if the memory cell is not conductive when the read voltage VR5 is applied, and the memory cell is conductive when the read voltage VR10 is applied, the top bit is determined to be "0"; if the memory cell is not conductive when the read voltage VR10 is applied, and the memory cell is conductive when the read voltage VR12 is applied, the top bit is determined to be "1"; if the memory cell is not conductive when the read voltage VR12 is applied, and the memory cell is conductive when the read voltage VR15 is applied, the top bit is determined to be "0"; and if the memory cell is not conductive when the read voltage VR15 is applied, the top bit is determined to be "1". Regarding the other cases that the upper bit, the middle bit and the lower bit are required to be read by the flash memory controller 110, respectively, the associated implementation details can be deduced by analogy.

It is noted that the gray code shown in the lower half of FIG. 2 is for illustrative purposes only, and is not meant to be a limitation of the present invention. In some examples, any suitable gray code can be used in the memory device 100, and the read voltages for determining the top bit, the upper bit, the middle bit and the lower bit may be changed accordingly.

The bit read from the memory cell by using a part of the read voltages VR1, VR2, . . . and VR15 can be regarded as a sign bit. For better comprehension, the flash memory controller 110 can utilize the data protection circuit 130 to process the sign bits obtained from a set of memory cells (e.g., 4K memory cells), and more particularly, utilize the de-randomizer within the randomizer and de-randomizer circuit RNDRN to perform de-randomizing operations, and utilize the decoder within encoder and decoder circuit ENDEC to perform error correction operations, for example, perform decoding to generate decoded data to correct errors. However, as the state intervals of the memory cells within the QLC block are typically very small, the states of the memory cells may have serious variations due to one or more issues among various issues (e.g., read disturbance, program disturbance, and data retention) that may occur in the flash memory module 120, and the processing result of the error correction operations may be unsuccessful.

According to a soft-decoding control scheme of the method, the flash memory controller 110 may control the flash memory module 120 to further apply additional read voltages to the memory cell to obtain a plurality of soft bits in order to increase the success rate of the error correction operations. For example, in a situation where the decoder fails to decode the sign bits obtained from the memory cells, the flash memory controller 110 may control the flash memory module 120 to use additional read voltages to read the memory cells again to obtain a first group of soft bits. More particularly, the decoder may comprise an LDPC decoder, such as a decoder capable of performing decoding related to LDPC codes, for performing soft-decoding. The decoder (e.g., the LDPC decoder) can decode the sign bits with the first group of soft bits. For example, when the flash memory controller 110 is trying to read the top page (e.g., the top bits of the memory cells) of the block, the flash memory controller 110 may control the flash memory module 120 to use the additional read voltages (VR5−ΔV), (VR10−ΔV), (VR12−ΔV) and (VR15−ΔV) to obtain the first group of soft bits, where the symbol "ΔV" may represent a predetermined voltage difference (e.g., one of multiple predetermined voltage differences, such as a first predetermined voltage difference selected from the multiple predetermined voltage differences). If the decoder still fails, the flash memory controller 110 may control the flash memory module 120 to use additional read voltages (VR5+ΔV), (VR10+ΔV), (VR12+ΔV) and (VR15+ΔV) to read the memory cells again to obtain a second group of soft bits, and the decoder (e.g., the LDPC decoder) can decode the sign bits with the first group of soft bits and the second group of soft bits. Assuming that instant response from the memory device 100 to the host device 50 is not required, if the decoder still fails, the flash memory controller 110 may control the flash memory module 120 to perform similar operations with another predetermined voltage difference (e.g., another of the multiple predetermined voltage differences), and the rest can be deduced by analogy. Thus, regarding the soft-decoding control scheme, the flash memory controller 110 may control the flash memory module 120 to use one or more sets of additional read voltages to further read the memory cells one or more times to obtain one or more groups of soft bits, for performing soft-decoding, for example, decoding the sign bits with the one or more groups of soft bits, where the soft bit group count of the one or more groups of soft bits and the associated retry count may be limited.

As the states of the memory cells in the QLC block may have serious variations, if the flash memory controller 110 needs to read data from the QLC block within the flash memory module 120, the flash memory controller 110 may read the memory cells and decode the data many times to try correcting the errors. The error correction may be successful for the case of normal use of the memory device 100, but may be unsuccessful for a certain extreme access condition. Although the error correction may be successful for the case of normal use of the memory device 100, each time the flash memory controller 110 reading the memory cells needs to transmit a read command to the flash memory module 120, and the flash memory module 120 needs a read busy time to read the sign bits or soft bits, as well as the associated transmission time, such as the significantly long transmission time for the case of reading the soft bits, and therefore, the performance of accessing the high density storage such as QLC blocks in the aforementioned any flash memory element 122-*n* (e.g., the flash memory element 122-*n* implemented as a three-dimensional (3D) NAND flash memory element based on a predetermined 3D structure) may be reduced. The method and the associated apparatus provided by the present invention can ensure that the memory device 100 can properly operate under various situations, and more particularly, can enhance the overall performance.

Figure 3:
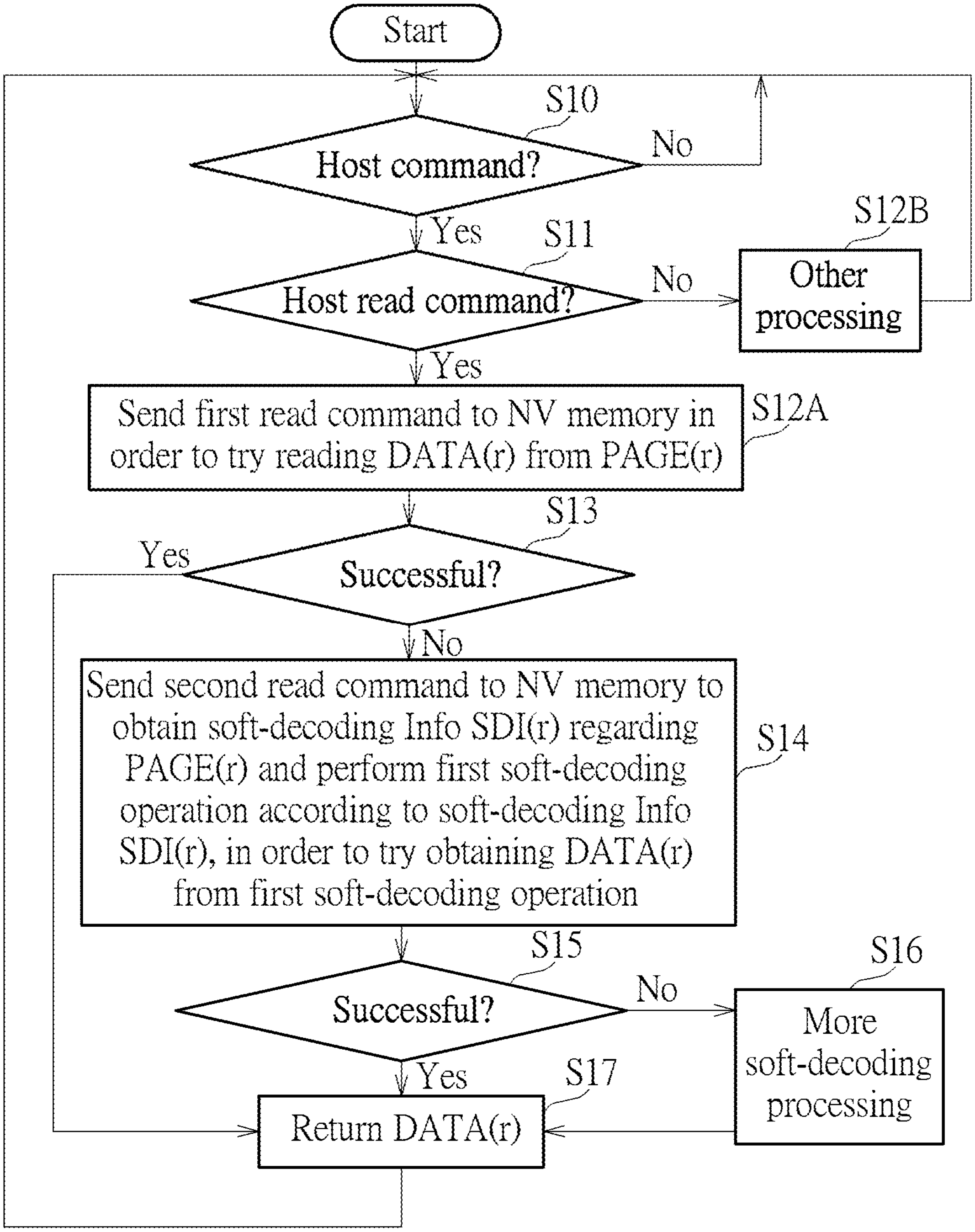
FIG. 3 illustrates associated operations in a soft-decoding control scheme of the method according to an embodiment of the present invention.

FIG. 3 illustrates associated operations in the soft-decoding control scheme of the method according to an embodiment of the present invention.

In Step S10, the flash memory controller 110 (or the microprocessor 112) can determine whether a host command (e.g., one of the host commands) is received. If Yes, Step S11 is entered; if No, Step S10 is entered.

In Step S11, the flash memory controller 110 (or the microprocessor 112) can determine whether the host command (i.e., the host command that is just received as detected in Step S10) is a host read command. If Yes, Step S12A is entered; if No, Step S12B is entered. The host read command may indicate reading data DATA(r) at a logical address, where the symbol "r" may represent an index corresponding to (e.g., equal to) the number of times that Step S12A is entered. For example, when the host read command such as a first host read command is received from the host device 50, the Step S12A is entered the first time (e.g., r=1); when the host read command such as a second host read command is received from the host device 50, the Step S12A is entered the second time (e.g., r=2); and the rest can be deduced by analogy. For better comprehension, the index r may be regarded as a loop index of at least one main loop comprising Steps S11, S12A, S13, etc., no matter whether any subsequent partial loop from Step S13 to Step S17 as shown in FIG. 3 is entered, but the present invention is not limited thereto.

In Step S12A, in response to the host read command (i.e., the host read command that is just received as detected in Steps S10 and S11), the flash memory controller 110 (or the microprocessor 112) can send a first read command to the NV memory such as the flash memory module 120 in order to try reading the data DATA(r) from a page PAGE(r) within a certain block among the plurality of blocks according to a physical address associated with the logical address, where the physical address may indicate the page PAGE(r) within this block.

For example, in response to the host read command, the flash memory controller 110 (or the microprocessor 112) can perform address mapping on the logical address according to the aforementioned at least one L2P address mapping table to obtain the physical address associated with the logical address, where the logical address can be one of the multiple logical addresses, and the physical address can be one of the multiple physical addresses. As the aforementioned at least one L2P address mapping table may comprise the mapping relationships between the multiple logical addresses and the multiple physical addresses, the flash memory controller 110 (or the microprocessor 112) can perform address mapping on the logical address to determine the physical address.

In Step S12B, the flash memory controller 110 (or the microprocessor 112) can perform other processing. For example, when the host command (i.e., the host command that is just received as detected in Step S10) is a host write command, the flash memory controller 110 (or the microprocessor 112) can perform data writing (e.g., data programming) on the flash memory module 120.

In Step S13, the flash memory controller 110 (or the microprocessor 112) can determine whether reading the data DATA(r) from the page PAGE(r) is successful. If Yes, Step S17 is entered; if No, Step S14 is entered.

In Step S14, in response to reading the data DATA(r) from the page PAGE(r) being unsuccessful, the flash memory controller 110 can send a second read command to the NV memory such as the flash memory module 120 to obtain soft-decoding information (Info) SDI(r) regarding the page PAGE(r) and utilize the decoder such as the LDPC decoder to perform a first soft-decoding operation according to the soft-decoding information SDI(r), in order to try obtaining the data DATA(r) from the first soft-decoding operation.

In Step S15, the flash memory controller 110 (or the microprocessor 112) can determine whether obtaining the data DATA(r) from the first soft-decoding operation is successful. If Yes, Step S17 is entered; if No, Step S16 is entered.

In Step S16, in response to obtaining the data DATA(r) from the first soft-decoding operation being unsuccessful, the flash memory controller 110 can utilize the decoder such as the LDPC decoder to perform more soft-decoding processing such as a second soft-decoding operation, for obtaining the data DATA(r) from the second soft-decoding operation.

In Step S17, the flash memory controller 110 can return the data DATA(r) to the host device 50.

For better comprehension, the soft-decoding control scheme may be illustrated with the working flow shown in FIG. 3, but the present invention is not limited thereto. According to some embodiments, one or more steps may be added, deleted, or changed in the working flow shown in FIG. 3.

Figure 4:
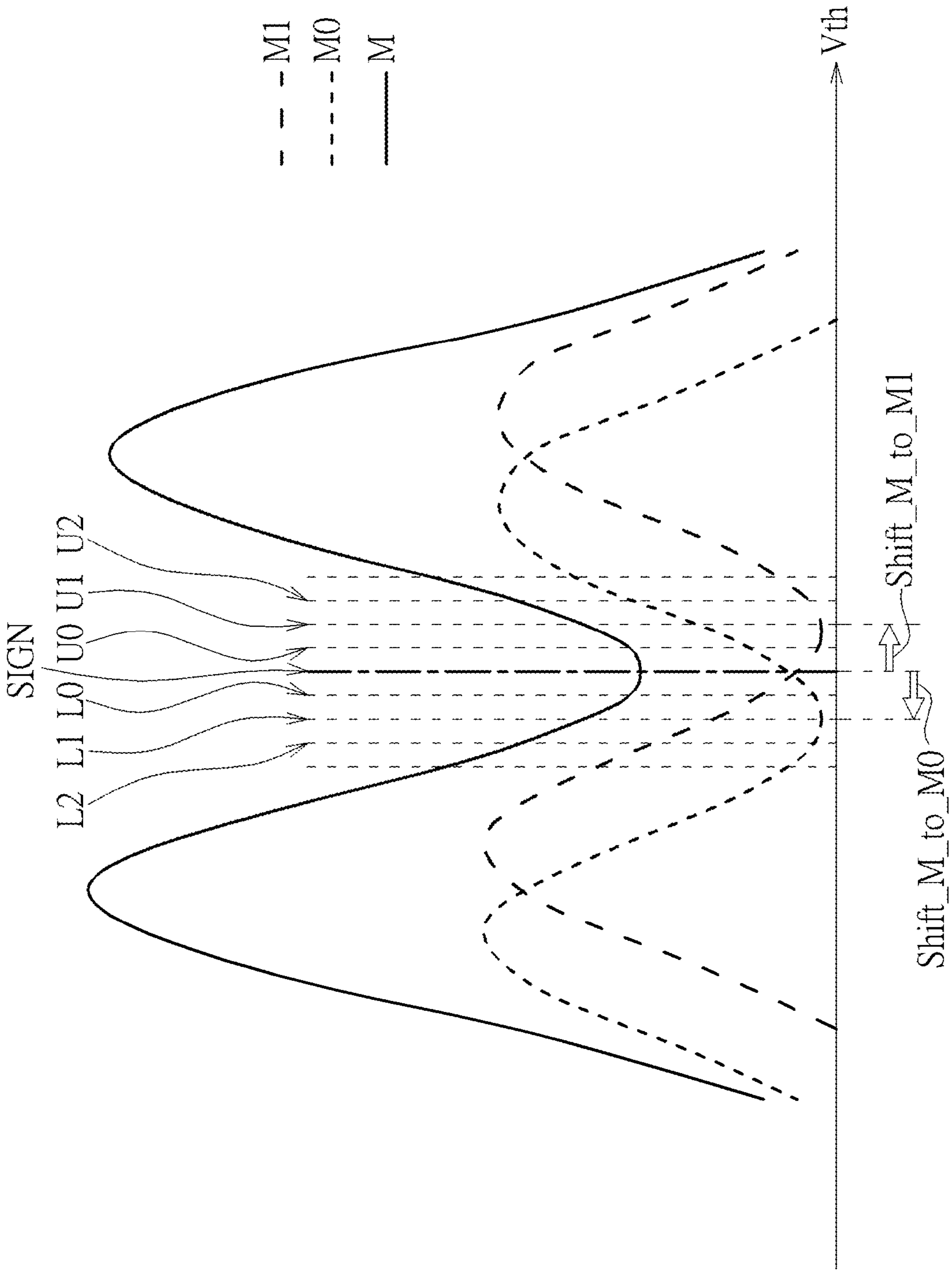
FIG. 4 is a diagram illustrating an access control scheme of the method according to an embodiment of the present invention.

FIG. 4 illustrates an access control scheme of the method shown in FIG. 3 according to an embodiment of the present invention. For better comprehension, it can be assumed that, among the memory cells within the aforementioned any flash memory element 122-*n*, there are at least two memory cell groups (e.g., at least two groups of memory cells) such as a first memory cell group M1 and a second memory cell group M0 for the first set of memory cells, where the first memory cell group M1 may represent a first group of memory cells having a first distribution, and the second memory cell group M0 may represent a second group of memory cells having a second distribution, but the present invention is not limited thereto. For example, the number of memory cell groups may vary. In addition, a certain memory cell group among the aforementioned at least two memory cell groups (e.g., the first memory cell group M1 and the second memory cell group M0) may have a distribution shift of a partial read sensing voltage distribution corresponding to this memory cell group with respect to a read sensing voltage distribution of a superset M, where the superset M may comprise the aforementioned at least two memory cell groups such as the first memory cell group M1 and the second memory cell group M0, but the present invention is not limited thereto. For example, the superset M may comprise the aforementioned any flash memory element 122-*n*, and this read sensing voltage distribution can be equal to a global read sensing voltage distribution of the aforementioned any flash memory element 122-*n*. For another example, the superset M may comprise the flash memory module 120, and this read sensing voltage distribution can be equal to an overall read sensing voltage distribution of the flash memory module 120.

As shown in FIG. 4, the first memory cell group M1 may have a first partial read sensing voltage distribution (e.g., the curve corresponding to the legend of "M1"), and more particularly, to have a first distribution shift Shift_M_to_M1 of the first partial read sensing voltage distribution corresponding to the first memory cell group M1 with respect to the read sensing voltage distribution of the superset M. In addition, the second memory cell group M0 may have a second partial read sensing voltage distribution (e.g., the curve corresponding to the legend of "M0"), and more particularly, to have a second distribution shift Shift_M_to_M0 of the second partial read sensing voltage distribution corresponding to the second memory cell group M0 with respect to the read sensing voltage distribution of the superset M.

For better comprehension, the read sensing voltage SIGN may represent a read sensing voltage for determining the sign bit, and the read sensing voltages U0, U1, U2, etc. that are greater than the read sensing voltage SIGN and the read sensing voltages L0, L1, L2, etc. that are less than the read sensing voltage SIGN may represent read sensing voltages for determining the soft bits, but the present invention is not limited thereto. For example, the read sensing voltages for determining the soft bits and/or the number of these read sensing voltages may vary.

Figure 5:
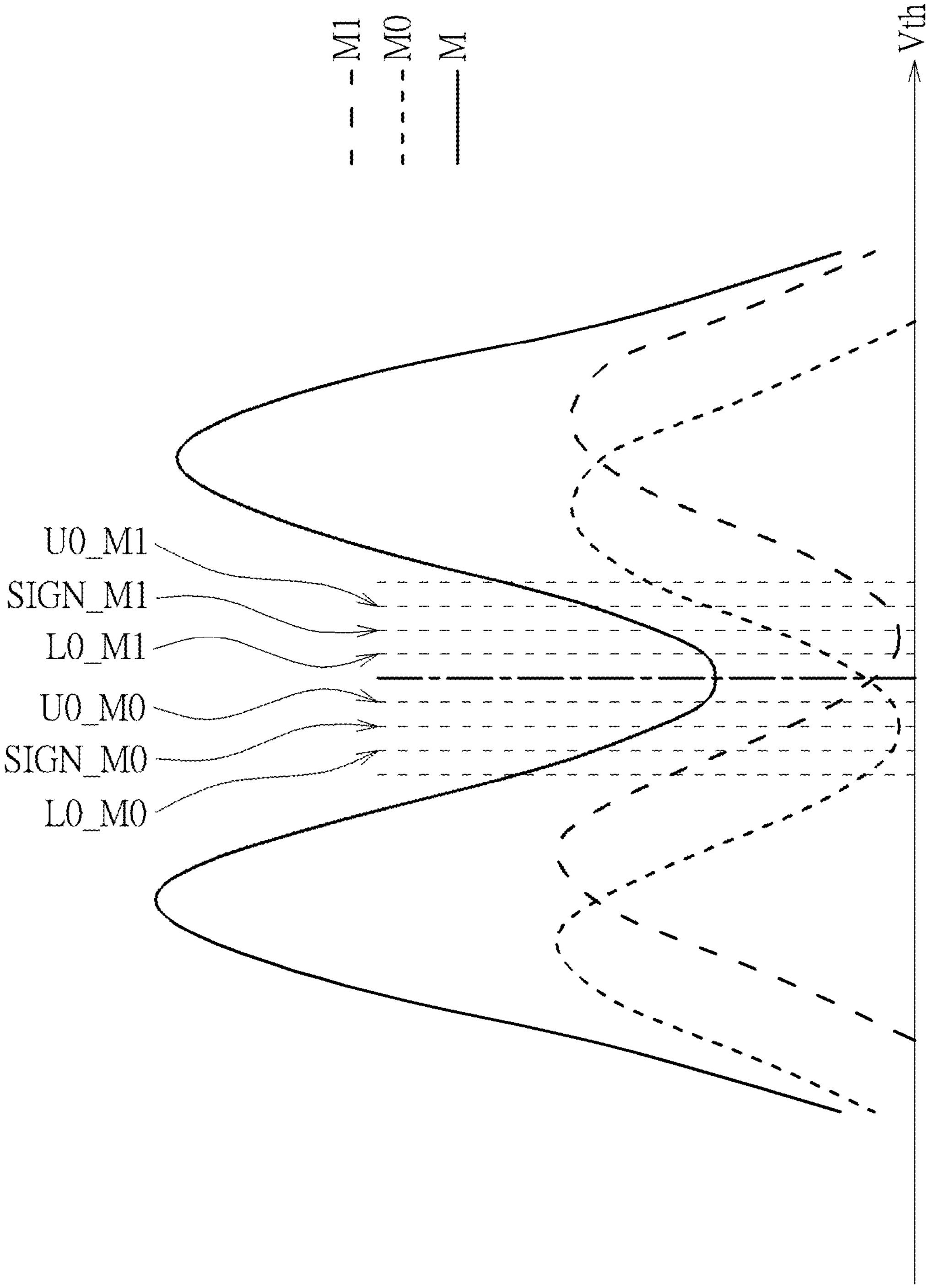
FIG. 5 illustrates a split control scheme of the method according to an embodiment of the present invention.

FIG. 5 illustrates a split control scheme of the method according to an embodiment of the present invention. The flash memory controller 110 (or the microprocessor 112) can control the flash memory module 120 to use the read sensing voltages U0, U1 and U2 shown in the right half part of FIG. 4 as the read sensing voltages L0_M1, SIGN_M1 and U0_M1 corresponding to the second soft-decoding operation for the first memory cell group M1, respectively, and control the flash memory module 120 to use the read sensing voltages L0, L1 and L2 shown in the left half part of FIG. 4 as the read sensing voltages U0_M0, SIGN_M0 and L0_M0 corresponding to the second soft-decoding operation for the second memory cell group M0, respectively.

According to some embodiments, the soft-decoding information corresponding to the superset M may comprise 1H2S (one hard-information bit, two soft-information bits) soft-decoding information for soft-decoding. If the soft-decoding is performed without considering the aforementioned at least two memory cell groups (e.g., the first memory cell group M1 and the second memory cell group M0), many high reliability errors (HREs) may occur, causing the error correction capability of the soft-decoding to be significantly reduced. The flash memory controller 110 can classify the 1H2S soft-decoding information into 1H1S (one hard-information bit, one soft-information bit) soft-decoding information corresponding to the first partial read sensing voltage distribution and 1H1S soft-decoding information corresponding to the second partial read sensing voltage distribution, for example, by using the noise canceler NC, and then merge back into the complete 1H1S soft-decoding. Since the number of HREs has been significantly reduced, even though the soft-information bit count has been reduced, the error correction capability can be greatly increased. For example, operations of the noise canceler NC in response to a group detection result Group can be designed according to the following pseudo code expression:

```
if (Group == M1) {
    SIGN_M1 = U1;
    L0_M1 = U0;
    U0_M1 = U2;
}
else if (Group == M0) {
    SIGN_M0 = L1;
    L0_M0 = L2;
    U0_M0 = L0;
}
```

In some examples, the soft-information bit count of the soft-decoding information corresponding to the superset M can be increased, and the soft-information bit count of the soft-decoding information corresponding to any partial read sensing voltage distribution among multiple partial read sensing voltage distribution can be increased correspondingly, and therefore, the error correction capability can be further increased.

The flash memory controller 110 can operate according to the aforementioned at least one control scheme with the aid of the data protection circuit 130, no matter whether the data protection circuit 130 is integrated into the control logic circuit 114 as shown in FIG. 1 or is implemented within the aforementioned at least one DSP engine such as the single DSP engine. In addition to the storage control scheme, the soft-decoding control scheme, the access control scheme and the split control scheme respectively shown in FIG. 2 to FIG. 5, the aforementioned at least one control scheme may further comprise one or more other control schemes regarding multiple predetermined procedures, and the flash memory controller 110 can perform any procedure among the multiple predetermined procedures such as a retention group scan procedure, a media scan procedure and a read-disturbance scan procedure, and more particularly, can finding the best read point with the lowest error bit rate and perform noise cancellation (e.g., inter-cell-interference cancellation) to reduce the error bit rate, and therefore can perform stronger soft-decoding.

Figure 6:
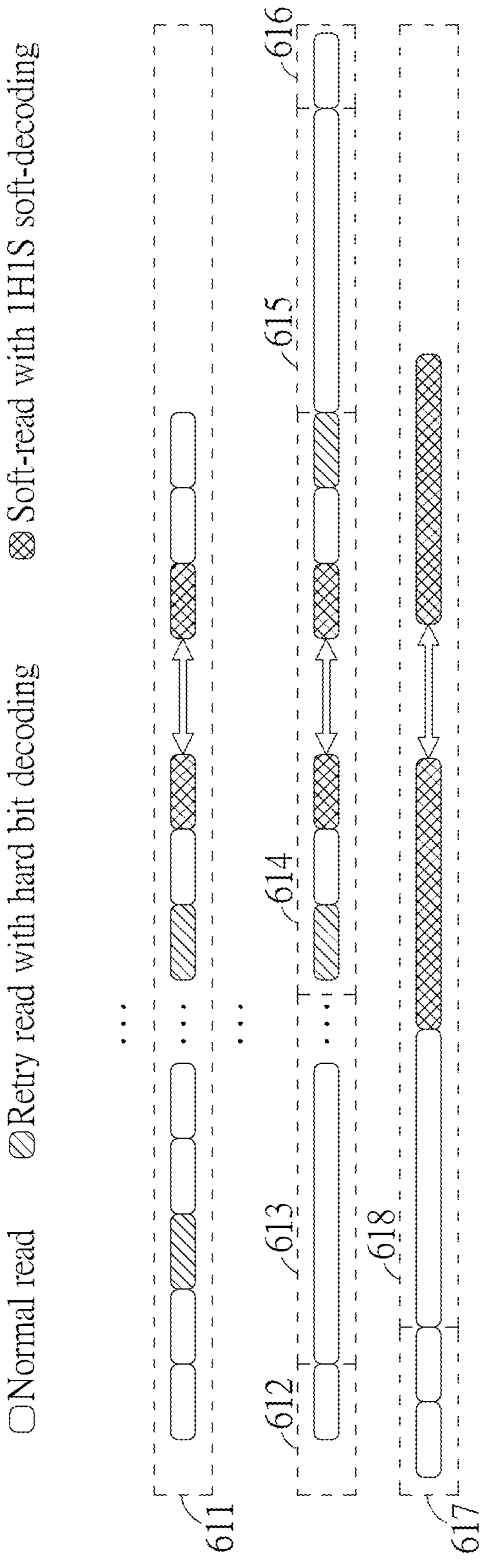
FIG. 6 illustrates a mixed read control scheme of the method according to an embodiment of the present invention.

FIG. 6 illustrates a mixed read control scheme of the method according to an embodiment of the present invention. The memory device 100 (or the flash memory controller 110 thereof) may perform a series of reading operations {611, 612, . . . , 618} corresponding to multiple predetermined reading operation cases (or "read cases") such as the 4K read case and the 16K read case, and the series of reading operations {611, 612, . . . , 618} may comprise a set of reading operations {611, 612, 614, 616, 617} corresponding to the 4K read case and a set of reading operations {613, 615, 618} corresponding to the 16K read case. As time goes by, there may be mixed read behaviors such as normal read, retry read with hard bit decoding, and soft-read with 1H1S (one hard-information bit, one soft-information bit) soft-decoding. For example, when the data protection circuit 130 is implemented within the aforementioned at least one DSP engine such as the single DSP engine in order to achieve a better overall performance, the mixed read behaviors may comprise mixed hard-decoding and fast soft-decoding in a single channel, and one transfer (e.g., the transfer of 1 to 4 sectors) will occupy one page-buffer among multiple page-buffer within the single DSP engine.

Regarding a re-decoding scenario, when reading the data DATA(r) from the page PAGE(r) is unsuccessful, transmitting the sign bit (or the hard bit) plus at least one soft bit (e.g., one or more soft bits) may be performed more than one time. Assuming that the throughput is critical, as transmitting the sign bit plus the aforementioned at least one soft bit takes a longer time than as usual, soft-bit transmission may become a bottleneck in some situations. The memory device 100 (or the flash memory controller 110 therein) can operate according to an enhanced soft-decoding control scheme of the method to enhance the overall performance.

Figure 7:
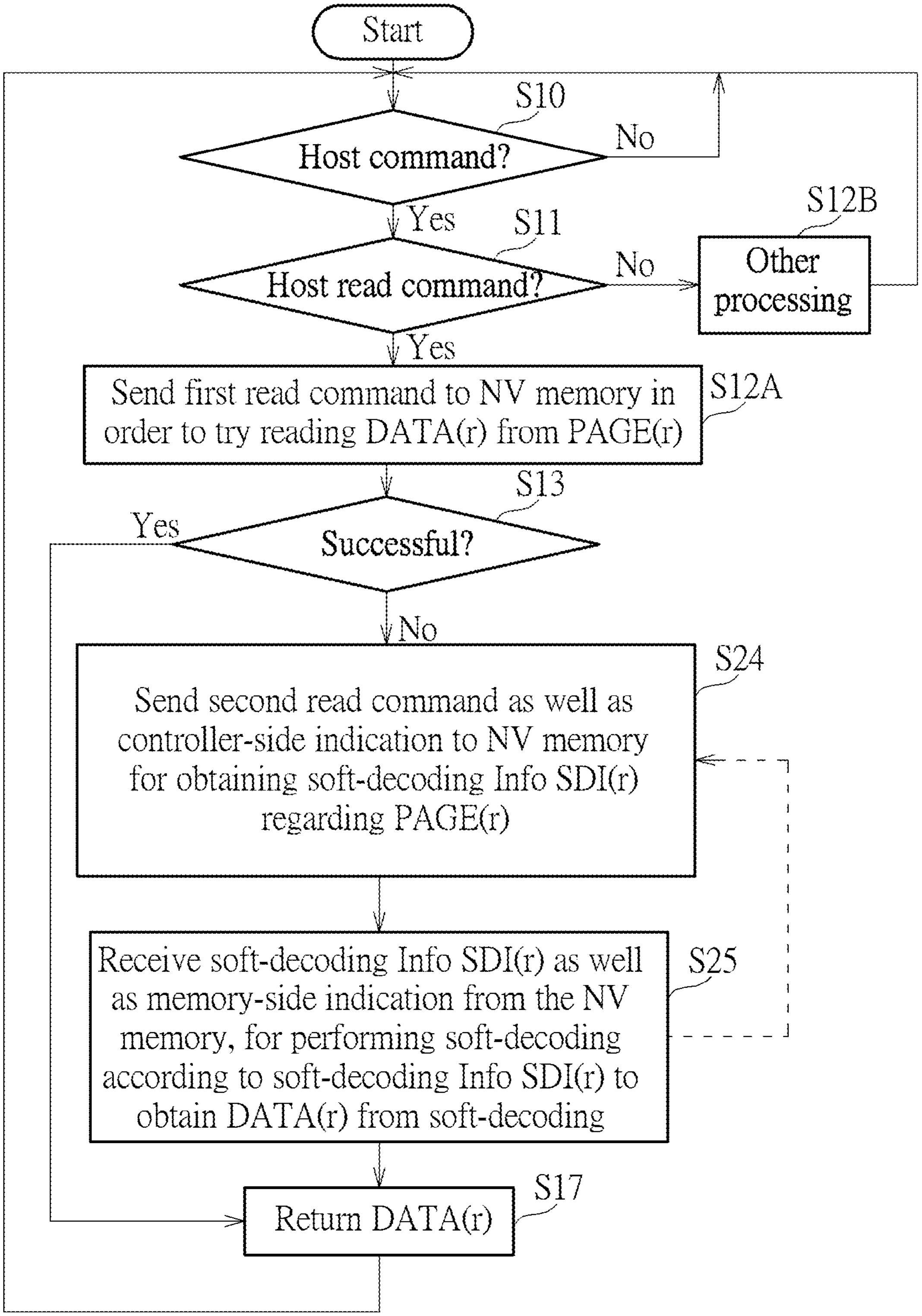
FIG. 7 illustrates associated operations in an enhanced soft-decoding control scheme of the method according to an embodiment of the present invention.

FIG. 7 illustrates associated operations in the enhanced soft-decoding control scheme of the method according to an embodiment of the present invention. The operations of Steps S10 to S13 and Step S17 shown in FIG. 7 may be the same as (or similar to) that of the embodiment shown in FIG. 3. When determining that performing soft-decoding is required, the flash memory controller 110 can control the flash memory module 120 to selectively transmit a small portion of soft bits among a plurality of soft bits, rather than transmitting all of the plurality of soft bits, and use a predetermined indication signal IND (e.g., any signal among at least one predetermined signal between the flash memory controller 110 and the flash memory module 120) as a hint regarding the selective soft-bit transmission, in order to enhance the overall performance. For better comprehension, assuming that "Y" may represent a positive integer greater than one and "y" may be an integer in the interval [0, (Y−1)], the states {PS(y)|y=0, . . . , (Y−1)} (e.g., the states PS(0), PS(1) . . . and PS(15) such as the sixteen states PS0, PS1 . . . and PS15, if Y=16) for a group of memory cells may be illustrated with Y corresponding curves along the horizontal axis, respectively, where the respective curves of any two adjacent states {(PS(y), PS(y+1))|y≤(Y−2)} (e.g., the first two states PS(1) and PS(2)) may partially overlap with each other due to Gaussian noise. As the randomizer within the randomizer and de-randomizer circuit RNDRN can be properly designed to perform the randomizing operations and make the randomized results as random as possible, the probabilities of obtaining the bits 1 and the bits 0 corresponding to the two adjacent states {(PS(y), PS(y+1))} from the first transmission of the flash memory module 120 may be 50% and 50%, respectively, equal to each other. In the second transfer for the soft-bit, taking the case of strong one (1) and weak zero (0) as an example, the probability of obtaining the bits 1 may be much greater than the probability of obtaining the bits 0. The flash memory controller 110 can control the flash memory module 120 to perform the selective soft-bit transmission, and more particularly, transmit any soft-byte carrying any bit 0 and prevent transmitting any soft-byte carrying eight bits 1 without any bit 0, in order to greatly reduce the number of times for the transmission of the additional bytes for soft-information, thereby enhancing the overall performance.

In Step S24, in response to reading the data DATA(r) from the page PAGE(r) being unsuccessful, the flash memory controller 110 can send a second read command as well as a controller-side indication IND_controller related to the selective soft-bit transmission, such as the controller-side indication IND_controller for selectively enabling the selective soft-bit transmission, to the NV memory such as the flash memory module 120 for obtaining the soft-decoding information (Info) SDI(r) regarding the page PAGE(r), where the page PAGE(r) may be arranged to store the data DATA(r). For example, the soft-decoding information SDI(r) corresponding to any bit Bit(i) of the data DATA(r) may be referred to as the soft-decoding information SDI(r, i), and may comprise a sign bit and at least one soft bit (e.g., one or more soft bits).

In Step S25, the flash memory controller 110 can receive the soft-decoding information SDI(r) as well as a memory-side indication IND_memory from the NV memory such as the flash memory module 120, for performing soft-decoding (e.g., the first soft-decoding operation mentioned in Step S14) with the decoder such as the LDPC decoder according to the soft-decoding information SDI(r) to obtain the data DATA(r) from the soft-decoding, where the memory-side indication IND_memory at a first cycle is arranged to indicate whether the NV memory such as the flash memory module 120 is going to transmit at least one soft bit at a second cycle, such as the second cycle coming after the first cycle. More particularly, the second cycle may represent the next cycle of the first cycle, such as the next cycle next to the first cycle.

The flash memory controller 110 can receive the soft-decoding information SDI(r) as well as the memory-side indication IND_memory from the flash memory module 120 via a set of data signals {DQ} and the predetermined indication signal IND, respectively, where the set of data signals {DQ} and the predetermined indication signal IND can be arranged to carry the soft-decoding information SDI(r) and the memory-side indication IND_memory, respectively.

When there is a need, Step S24 can be re-entered as shown in the lower half part of FIG. 7, where the arrow depicted with dashed lines from Step S25 to Step S24 may indicate the associated loop. For example, in response to obtaining the data DATA(r) from the first soft-decoding operation being unsuccessful, the flash memory controller 110 (or the microprocessor 112) can re-execute the loop comprising Steps S24 and S25 in another iteration, in order to perform more soft-decoding (e.g., the aforementioned more soft-decoding processing such as the second soft-decoding operation in Step S16), for obtaining the data DATA(r) from the second soft-decoding operation. For brevity, similar descriptions for this embodiment are not repeated in detail here.

For better comprehension, the enhanced soft-decoding control scheme may be illustrated with the working flow shown in FIG. 7, but the present invention is not limited thereto. According to some embodiments, one or more steps may be added, deleted, or changed in the working flow shown in FIG. 7. For example, after a power-up of the memory device 100, the flash memory controller 110 can send a read command as well as the controller-side indication IND_controller to the NV memory such as the flash memory module 120, for determining whether to enable the selective soft-bit transmission at the flash memory module 120. For brevity, similar descriptions for these embodiments are not repeated in detail here.

Figure 8:
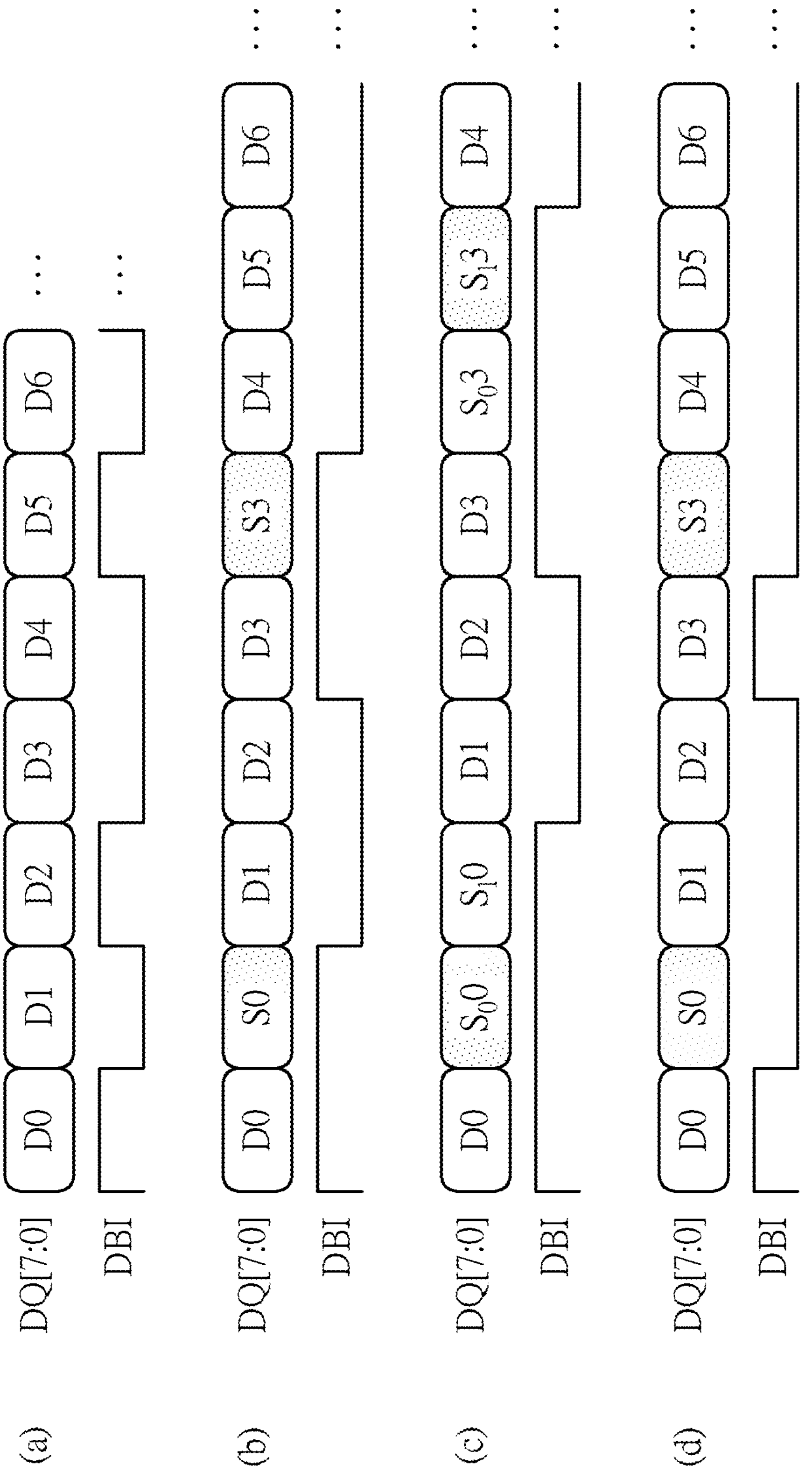
FIG. 8 illustrates some examples of a set of data signals and a predetermined indication signal that are involved with the enhanced soft-decoding control scheme shown in FIG. 7 according to an embodiment of the present invention.

FIG. 8 illustrates some examples of the set of data signals {DQ} and the predetermined indication signal IND that are involved with the enhanced soft-decoding control scheme shown in FIG. 7 according to an embodiment of the present invention. The set of data signals {DQ} may comprise multiple data signals {DQ} on a data bus between the flash memory controller 110 and the flash memory module 120, such as the multiple data signals {DQ} corresponding to at least one byte (e.g., one or more bytes) for transmitting multiple bits of the aforementioned at least one byte simultaneously. For the case that the aforementioned at least one byte represents a single byte, the multiple data signals {DQ} may be implemented as the data signals DQ[7:0] such as the data signals {DQ[7], DQ[6], . . . , DQ[0]}, but the present invention is not limited thereto. Assuming that "CNT byte" may be a positive integer, for the case that the aforementioned at least one byte represents CNT byte byte(s), the multiple data signals {DQ} may be implemented as the data signals DQ[((CNT byte*8)−1):0]. In addition, the predetermined indication signal IND may represent an other-purpose signal which is originally used for at least one other purpose differing from a purpose of the selective soft-bit transmission. In a situation where the transmission for the aforementioned at least one other purpose is not needed, the other-purpose signal is used as the predetermined indication signal IND. For example, regarding the aforementioned at least one other purpose, the other-purpose signal is a data-bus inversion (DBI) signal for indicating whether the data bits on the set of data signals {DQ} (e.g., the data signals DQ[7:0]) have been inverted.

As shown in the sub-diagram (a), when the transmission for the aforementioned at least one other purpose such as the purpose of data-bus inversion is needed, the DBI signal may be arranged to transit between multiple predetermined voltage levels corresponding to different logic values, such as a high voltage level corresponding to the logic value 1 and a low voltage level corresponding to the logic value 0, for indicating whether the data bits on the data signals DQ[7:0] have been inverted for power saving (e.g., the power saving by reducing usage of the high voltage level, since the high voltage level is typically power consuming), and the bytes {D(0), D(1), D(2), D(3), D(4), D(5), D(6), . . . } (or "the bytes {D0, D1, D2, D3, D4, D5, D6, . . . }") corresponding to the data DATA(r) may be sent from the flash memory module 120 to the flash memory controller 110 in multiple cycles #0, #1, #2, #3, #4, #5, #6, etc., respectively.

As shown in the sub-diagram (b), when the transmission for the aforementioned at least one other purpose such as the purpose of data-bus inversion is not needed, the DBI signal may be arranged to transit between the multiple predetermined voltage levels corresponding to different logic values, such as the high voltage level corresponding to the logic value 1 and the low voltage level corresponding to the logic value 0, for indicating whether there is any soft bit coming after a current data (or sign) bit on any data signal DQ among the multiple data signals {DQ} such as the data signals DQ[7:0], and a sequence of bytes {D(0), S(0), D(1), D(2), D(3), S(3), D(4), D(5), D(6), . . . } (or "the sequence of bytes {D0, S0, D1, D2, D3, S3, D4, D5, D6, . . . }") corresponding to the soft-decoding information SDI(r) (e.g., the data (or sign) bytes {D0, D1, D2, D3, D4, D5, D6, . . . } interleaved with the soft bytes {S0, S3, . . . }, with the soft bytes {S0, S3, . . . } coming after the corresponding data bytes {D0, D3, . . . }, respectively) may be sent from the flash memory module 120 to the flash memory controller 110 in multiple cycles #0, #1, #2, #3, #4, #5, #6, #7, #8, etc., respectively. Assuming that one chunk stored in the flash memory module 120 may comprise 4676 bytes (e.g., a combination of 4096 data bytes and 580 parity bytes (or "4K580B") respectively corresponding to the data and parity within the chunk, where (4096+580)=4676), before transmitting the soft-decoding information SDI(r), the flash memory module 120 may prepare and buffer (or temporarily store) the data bytes {D0, D1, . . . , D4675} and the soft bytes {S0, S1, . . . , S4675} in a data-byte buffer and a soft-byte buffer within the flash memory module 120, respectively. In comparison with transmitting all of the data (or sign) bytes {D0, D1, . . . , D4675} and the soft bytes {S0, S1, . . . , S4675} based on the soft-decoding control scheme as shown in FIG. 3, transmitting the data (or sign) bytes {D0, D1, . . . , D4675} and only a small portion of soft bytes among the soft bytes {S0, S1, . . . , S4675} based on the enhanced soft-decoding control scheme as shown in FIG. 7 can greatly enhance the overall performance.

As shown in the sub-diagram (c), for the case that the aforementioned at least one soft bit within the soft-decoding information SDI(r, i) comprises multiple soft bits, a sequence of bytes {D(0), $S_0$(0), $S_1$(0), D(1), D(2), D(3), $S_0$(3), $S_1$(3), D(4), . . . } (or "the sequence of bytes {D0, $S_0$0, $S_1$0, D1, D2, D3, $S_0$3, $S_1$3, D4, . . . }") corresponding to the soft-decoding information SDI(r) (e.g., the data (or sign) bytes {D0, D1, D2, D3, D4, . . . } interleaved with the soft bytes {{$S_0$0, $S_1$0}, {$S_0$3, $S_1$3}, . . . }, with the soft bytes {{$S_0$0, $S_1$0}, {$S_0$3, $S_1$3}, . . . } coming after the corresponding data bytes {D0, D3, . . . }, respectively) may be sent from the flash memory module 120 to the flash memory controller 110 in multiple cycles #0, #1, #2, #3, #4, #5, #6, #7, #8, etc., respectively.

As shown in the sub-diagram (d), in a special case that the aforementioned at least one soft bit within the soft-decoding information SDI(r, i) comprises a single soft bit only, for example, due to any soft-decoding restriction as controlled by the flash memory controller 110 (or the microprocessor 112), the pulses of the DBI signal may be shrunk to become one-cycle pulses, respectively, where these pulses may have the same pulse width of one cycle. In general, it is better that there is no such soft-decoding restriction in order to achieve better flexibility for most cases, and it is not required that the respective pulse widths of all pulses of the DBI signal are equal to each other. Examples of the memory-side indication IND_memory may include, but not limited to: the rising edges of the DBI signal, the high voltage level in any cycle beginning with any rising edge among the rising edges of the DBI signal, and a pulse beginning with any rising edge among the rising edges of the DBI signal, no matter whether this pulse is within a single cycle (e.g., the cycle beginning with this rising edge) or not.

According to some embodiments, the multiple data signals {DQ} such as the data signals DQ[7:0], the soft bytes and the associated byte arrangement on the data signals DQ[7:0], the curves of the DBI signal, and/or the byte count per chunk in the flash memory module 120 may vary. In addition, in at least one scenario related to the soft-decoding using the selective soft-bit transmission, a data byte on the data signals DQ[7:0], such as one of the data bytes {D0, D1, D2, D3, D4, D5, D6, . . . } in the sequence of bytes {D(0), S(0), D(1), D(2), D(3), S(3), D(4), D(5), D(6), . . . }, may act as a sign byte, and a data bit within this data byte may act as a sign bit.

Figure 9:
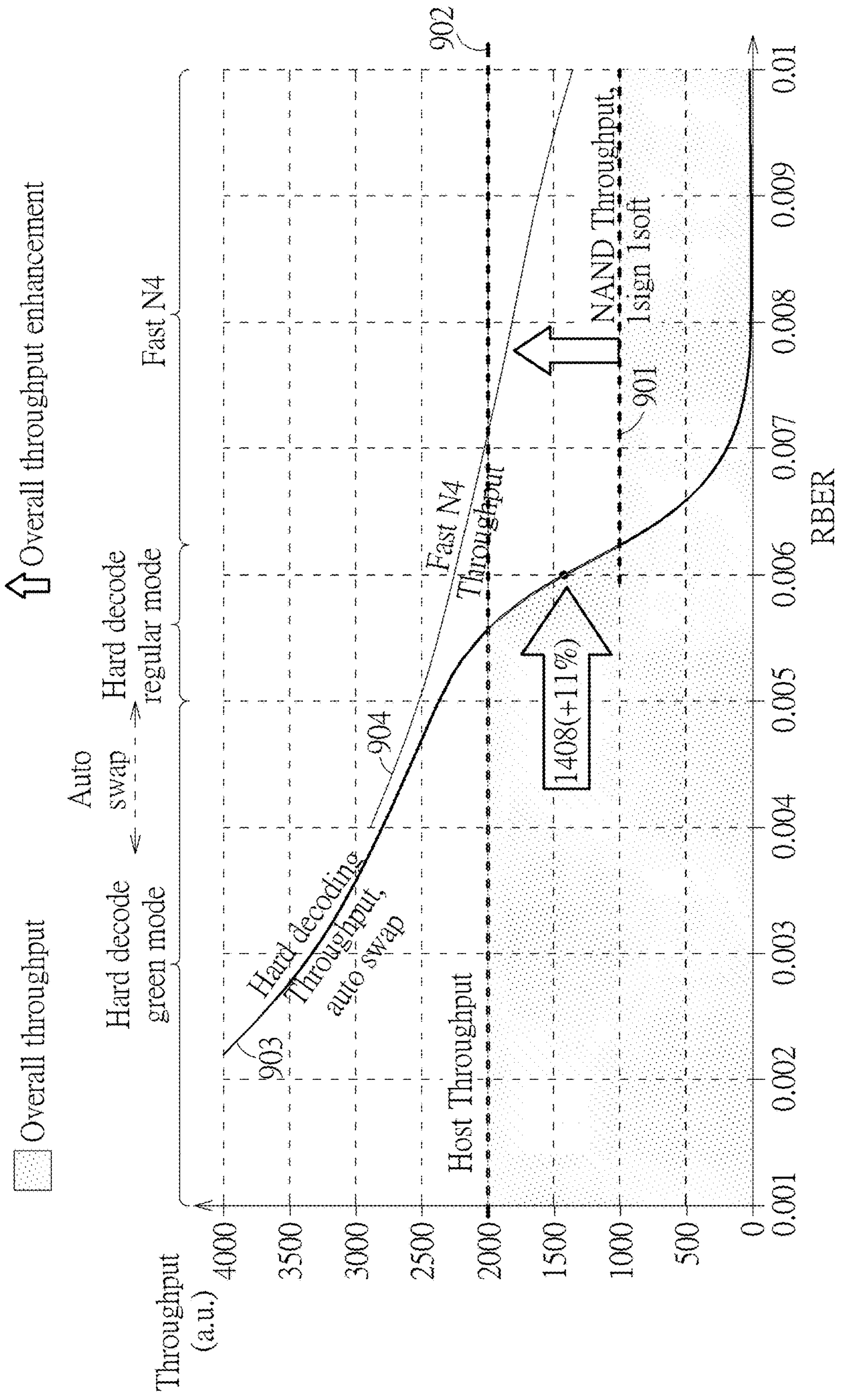
FIG. 9 illustrates overall throughput enhancement of the memory device by the enhanced soft-decoding control scheme shown in FIG. 7 according to an embodiment of the present invention.

FIG. 9 illustrates overall throughput enhancement of the memory device 100 by the enhanced soft-decoding control scheme shown in FIG. 7 according to an embodiment of the present invention, where the horizontal axis may represent the raw bit error rate (RBER), and the vertical axis may represent the throughput, measured in appointed/predetermined unit (a.u.) such as megabytes per second (MB/s), but the present invention is not limited thereto. For example, multiple predetermined decoding modes of the memory device 100 (or the flash memory controller 110 therein) may comprise the hard decode green mode (e.g., the hard decoding mode with the power saving control), the hard decode regular mode (e.g., the hard decoding mode without the power saving control) and the N4 soft-decoding mode such as the fast N4 soft-decoding mode (labeled "Fast N4" for brevity). As the flash memory controller 110 can perform automatic (auto) swap between the hard decode green mode and hard decode regular mode, the hard decoding throughput 903 of these hard decoding modes can change smoothly with respect to the RBER. As shown in the left half part of FIG. 9, when the hard decoding throughput 903 is greater than the host throughput 902 (e.g., the direct memory access (DMA) throughput from the flash memory module 120 to the flash memory controller 110, with the flash memory controller 110 being regarded as the host of the flash memory module 120), the host throughput 902 may be an upper limit of the overall throughput. As shown in the central part of FIG. 9, the hard decoding throughput 903 may decrease to be less than the host throughput 902 and become a new upper limit of the overall throughput.

Regarding the right half part of FIG. 9, before the enhanced soft-decoding control scheme is applied to the memory device 100, although the fast N4 throughput 904 of the fast N4 soft-decoding mode may be higher than the hard decoding throughput 903, switching to the fast N4 soft-decoding mode is not helpful on enhancing the overall throughput since the NAND throughput 901 of transmitting two bits per soft-decoding symbol by the flash memory module 120 may become another new upper limit of the overall throughput as shown in the right half part of FIG. 9. More particularly, for the aforementioned any bit Bit(i) of the data DATA(r), the flash memory module 120 may transmit a two-bits symbol such as a combination of one sign/hard bit and one soft bit (labeled “1sign 1soft” for brevity), and the overall throughput may be limited by the NAND throughput 901. After the enhanced soft-decoding control scheme is applied to the memory device 100, the overall throughput can be enhanced, and can approach the boundary formed with the fast N4 throughput 904 and the host throughput 902 (e.g., the boundary of the lower throughput among the fast N4 throughput 904 and the host throughput 902, depending on which of them is closer to the NAND throughput 901 along the vertical direction). For brevity, similar descriptions for this embodiment are not repeated in detail here.

According to some embodiments, the respective curves of the NAND throughput 901, the host throughput 902, the hard decoding throughput 903 and the fast N4 throughput 904, the respective scales of the horizontal axis and the vertical axis, and/or the associated decoding modes may vary.

Figure 10:
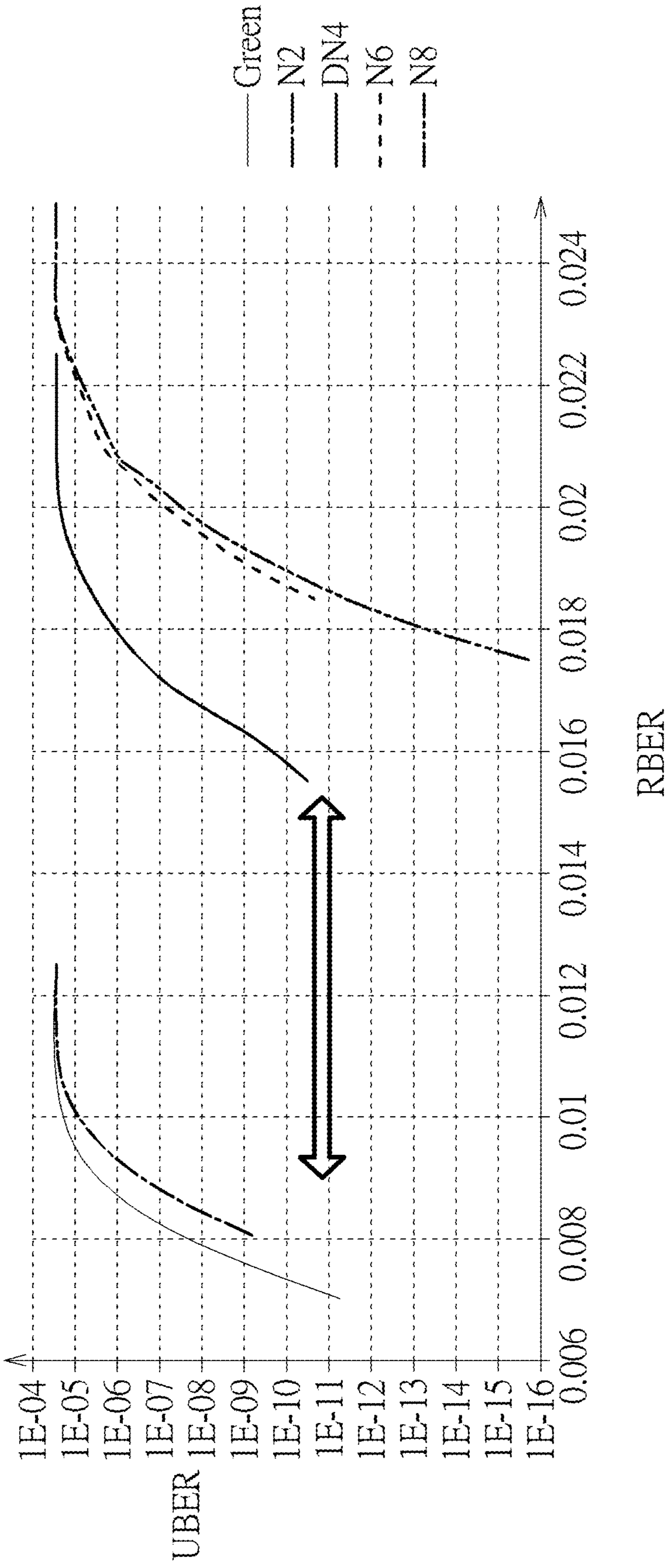
FIG. 10 illustrates associated decoding performance involved with the enhanced soft-decoding control scheme shown in FIG. 7 according to an embodiment of the present invention.

FIG. 10 illustrates the associated decoding performance involved with the enhanced soft-decoding control scheme shown in FIG. 7 according to an embodiment of the present invention, where the horizontal axis may represent the RBER, and the vertical axis may represent the uncorrectable bit error rate (UBER). The memory device 100 (or the flash memory controller 110 therein) can dynamically switch among the multiple predetermined decoding modes, and the multiple predetermined decoding modes may comprise the hard decode green mode, the N2 decoding mode, the N4 soft-decoding mode, the N6 soft-decoding mode and the N8 soft-decoding mode (respectively labeled “Green”, “N2”, “DN4”, “N6” and “N8” for brevity). Assuming that one chunk stored in the flash memory module 120 may comprise 4676 bytes such as the 4K580B mentioned above, the memory device 100 (or the flash memory controller 110 therein) may be designed to make the UBER be as lower as possible, and more particularly, be less than or equal to a target UBER such as 0.000000001% (i.e., $1*10^{-11}$, or “1E-11” in the E notation), and the curves of the hard decode green mode and the N2 decoding mode may indicate that these two decoding modes can guarantee successful decoding for narrower intervals of the RBER, such as a first interval [0, 0.007] and a second interval [0, 0.0075] having lower upper limits, respectively, but cannot guarantee successful decoding if the RBER becomes higher. In addition, regarding the same target UBER such as 0.000000001%, the curves of the N4 soft-decoding mode, the N6 soft-decoding mode and the N8 soft-decoding mode may indicate that these three decoding modes can guarantee successful decoding for wider intervals of the RBER, such as a third interval [0, 0.015], a fourth interval [0, 0.0183] and a fifth interval [0, 0.0186] having higher upper limits, respectively. As the N4 soft-decoding mode can provide much better capability than that of the first two decoding modes, the memory device 100 (or the flash memory controller 110 therein) that is capable of dynamically switching to the N4 soft-decoding mode without being hindered by the NAND throughput 901 shown in FIG. 9 can enhance the overall decoding-capability. For brevity, similar descriptions for this embodiment are not repeated in detail here.

According to some embodiments, the respective curves of the hard decode green mode, the N2 decoding mode, the N4 soft-decoding mode, the N6 soft-decoding mode and the N8 soft-decoding mode, the respective scales of the horizontal axis and the vertical axis, and/or the byte count per chunk in the flash memory module 120 may vary.

Figure 11:
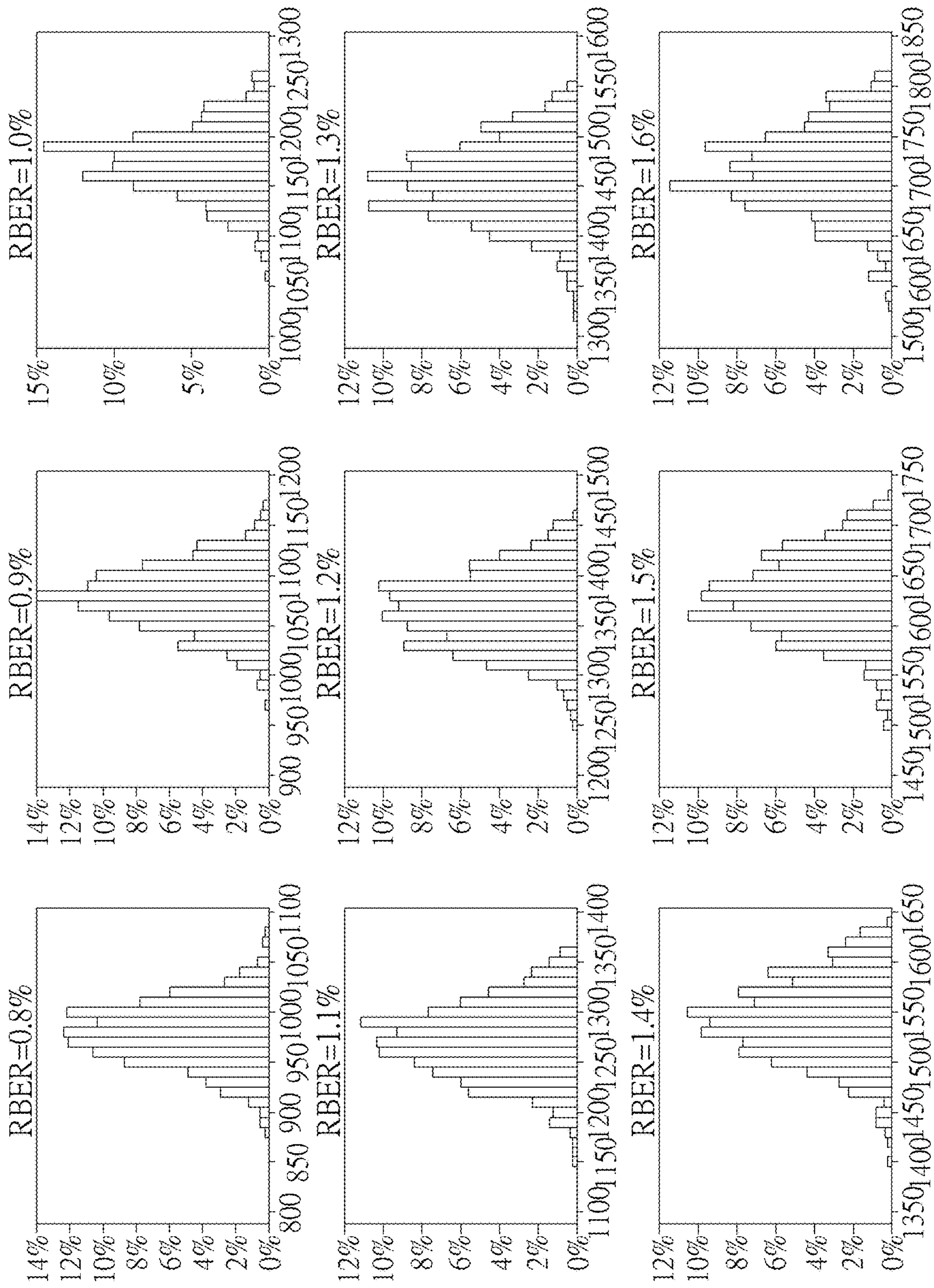
FIG. 11 illustrates a series of histograms within a pre-established database involved with the enhanced soft-decoding control scheme shown in FIG. 7 according to an embodiment of the present invention.

FIG. 11 illustrates a series of histograms (e.g., the histograms respectively corresponding to RBER=0.8%, RBER=0.9%, . . . , and RBER=1.6%) within a pre-established database involved with the enhanced soft-decoding control scheme shown in FIG. 7 according to an embodiment of the present invention. Based on the pre-established database, any histogram (e.g., the histogram indexed by the RBER) among the series of histograms may indicate a normal distribution (or Gaussian distribution) regarding the zeros count of the second data transfer for the soft-bit under the N4 soft-decoding mode, where the horizontal axis may represent the zeros count with step size of ten (10), and the vertical axis may represent the percentage. Taking the sequence of bytes {D0, S0, D1, D2, D3, S3, D4, D5, D6, . . . } shown in the sub-diagram (b) of FIG. 8 as an example, the transfer of any bit within a soft byte (e.g., the soft bytes {S0, S3, . . . } coming after the corresponding data bytes {D0, D3, . . . }, respectively) may be regarded as the second data transfer.

When the RBER is given, the aforementioned any histogram among the series of histograms may indicate a certain zeros count by the mean (or the expectation) of the distribution. For example, assuming that one chunk stored in the flash memory module 120 may comprise 4676 bytes such as the 4K580B mentioned above, the histogram corresponding RBER=0.8% may indicate that the zeros count is expected to be equal to 1000 when RBER=0.8%, and the 1000 bits 0 (e.g., the zero-bits, all of which are equal to zero) may randomly fall into some of the 4676 soft bytes {S0, S1, . . . , S4675} that are buffered in the soft-byte buffer of the flash memory module 120, just like 1000 balls may randomly fall into some of 4676 baskets. As most bits within the 4676 buffered soft bytes {S0, S1, . . . , S4675} are the bits 1 (e.g., the one-bits, all of which are equal to one), the flash memory controller 110 can carry the controller-side indication IND_controller in the second read command, and more particularly, send the second read command carrying the controller-side indication IND_controller for enabling the selective soft-bit transmission at the flash memory module 120, to make the flash memory module 120 perform the selective soft-bit transmission. During performing the selective soft-bit transmission, the flash memory module 120 can detect or check whether any soft byte among the 4676 buffered soft bytes {S0, S1, . . . , S4675} comprises at least one bit 0. If the aforementioned any soft byte among the 4676 buffered soft bytes {S0, S1, . . . , S4675} comprises any bit 0, the flash memory module 120 can transmit this soft byte (e.g., one of the soft bytes {S0, S3, . . . }); otherwise, in a situation where the aforementioned any soft byte among the 4676 buffered soft bytes {S0, S1, . . . , S4675} comprises no bit 0, the flash memory module 120 can prevent transmitting this soft byte.

TABLE 1

| RBER | Strong(1) | Weak(0) |
|---|---|---|
| 0.8% | 97.377% | 2.623% |
| 0.9% | 97.113% | 2.887% |
| 1.0% | 96.855% | 3.145% |
| 1.1% | 96.597% | 3.403% |
| 1.2% | 96.349% | 3.651% |
| 1.3% | 96.108% | 3.892% |
| 1.4% | 95.872% | 4.128% |
| 1.5% | 95.640% | 4.360% |
| 1.6% | 95.412% | 4.588% |

Table 1 illustrates an example of the respective percentages of the strong one (or "strong(1)") and the weak zero (or "weak(0)") with respect to the BER within the pre-established database. As most bits within the 4676 buffered soft bytes {S0, S1, . . . , S4675} are the bits 1, the flash memory controller 110 can control the flash memory module 120 to perform the selective soft-bit transmission, for example, by transmitting only the aforementioned small portion of soft bytes among the soft bytes {S0, S1, . . . , S4675}, such as the soft bytes {S0, S3, . . . } in the sequence of bytes {D0, S0, D1, D2, D3, S3, D4, D5, D6, . . . }, rather than all of the soft bytes {S0, S1, . . . , S4675}.

According to some embodiments, the pre-established database, the series of histograms, the respective percentages of the strong(1) and the weak(0) with respect to the BER, and/or the associated range of the RBER may vary.

Figure 12:
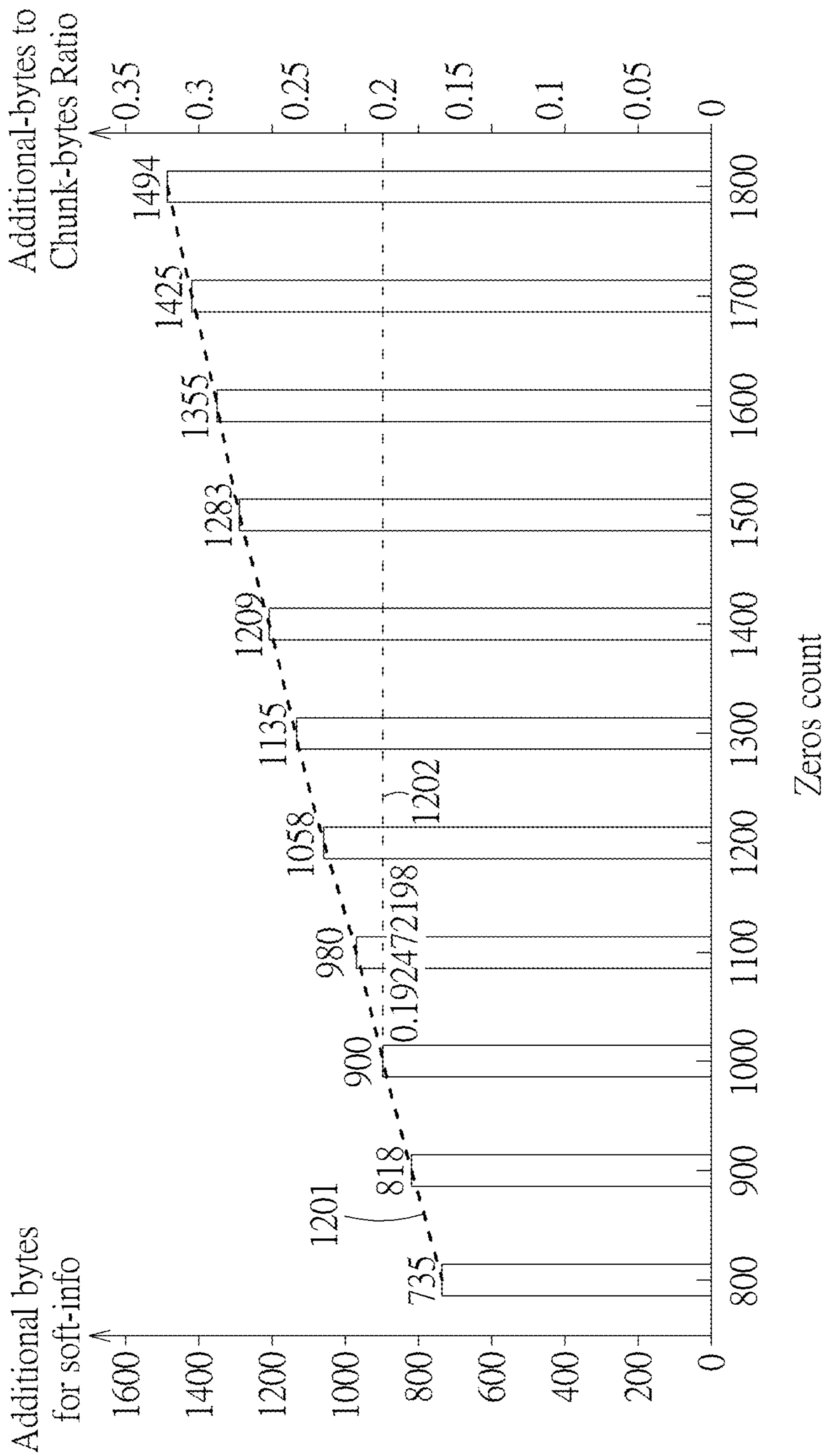
FIG. 12 illustrates associated statistical data within the pre-established database involved with the enhanced soft-decoding control scheme shown in FIG. 7 according to an embodiment of the present invention.

FIG. 12 illustrates the associated statistical data within the pre-established database involved with the enhanced soft-decoding control scheme shown in FIG. 7 according to an embodiment of the present invention, where the associated statistical data may comprise the additional bytes for soft-information (soft-info) and the additional-bytes to chunk-bytes ratio. For example, assuming that one chunk stored in the flash memory module 120 may comprise 4676 bytes such as the 4K580B mentioned above, the number of the additional bytes for soft-information and the zeros count may have a positive correlation as illustrated with the trend 1201. For the case of RBER=0.8%, when the zeros count is equal to 1000, the number of the additional bytes for soft-information may be equal to 900, and the additional-bytes to chunk-bytes ratio may be equal to (900/4676) =0.19247219846 . . . (labeled "0.192472198" for brevity) as illustrated with the reference line 1202. The overall throughput at RBER=0.8% can be enhanced significantly, and more particularly, can be increased from the NAND throughput 901 shown in FIG. 9 (e.g., 50% of the host throughput 902) to (1/(1+0.19247219846 . . . )), approximately 83.86%, of the host throughput 902.

According to some embodiments, the additional bytes for soft-information, the additional-bytes to chunk-bytes ratio, the associated range of the zeros count, and/or the associated range of the RBER may vary. In addition, at least one portion (e.g., a portion or all) of the pre-established database can be integrated into the memory device 100, in particular, in any storage unit (or any memory) of the flash memory controller 110 or the flash memory module 120, and the flash memory controller 110 can use the pre-established database as a reference for determining whether to enable the selective soft-bit transmission at the flash memory module 120.

Figure 13:
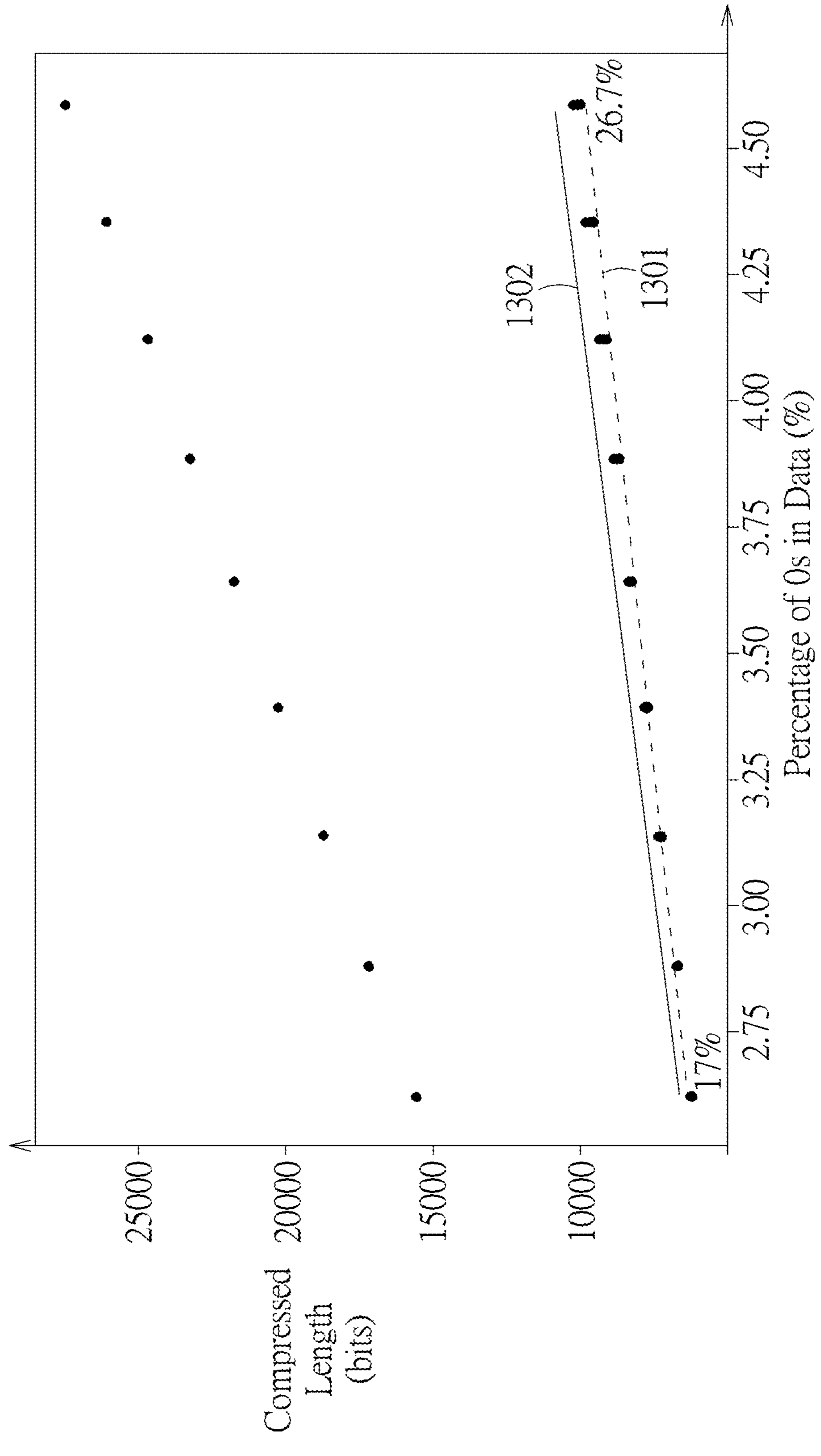
FIG. 13 illustrates more statistical data within the pre-established database involved with the enhanced soft-decoding control scheme shown in FIG. 7 according to an embodiment of the present invention.

FIG. 13 illustrates more statistical data within the pre-established database involved with the enhanced soft-decoding control scheme shown in FIG. 7 according to an embodiment of the present invention, where the horizontal axis may represent the percentage of zeros (0s) in the data (e.g., one data chunk comprising 4676 bytes such as the 4K580B mentioned above, or 37408 bits in total), denoted using the percent sign (%), and the vertical axis may represent the compressed length, expressed with the number of bits. For example, one or more ordinary data compression control schemes regarding data compression, such as a bit-level run length encoding (RLE) control scheme and a position-based control scheme, may require additional compression and de-compression circuits/engines at the flash memory module 120 and the flash memory controller 110, respectively, and may further require a new and complicated communication protocol for the transmission of the corresponding compressed data. The associated compression rate may be obtained from dividing the compressed length by the bit count (e.g., 37408) of the data chunk, and may vary from 17% to 26.7% for the trend 1301 corresponding to the ordinary data compression control schemes. As the trend 1302 corresponding to the enhanced soft-decoding control scheme is very close to the trend 1301 corresponding to the ordinary data compression control schemes, and the enhanced soft-decoding control scheme does not need the implementation of the additional compression and de-compression circuits/engines, the new and complicated communication protocol, etc. as in the ordinary data compression control schemes, the enhanced soft-decoding control scheme is much better than the ordinary data compression control schemes. Therefore, the method of the present invention and the associated apparatus such as the memory device 100, the flash memory controller 110, etc. can indeed solve the related art problems without introducing any side effect or in a way that is less likely to introduce a side effect.

Figure 14:
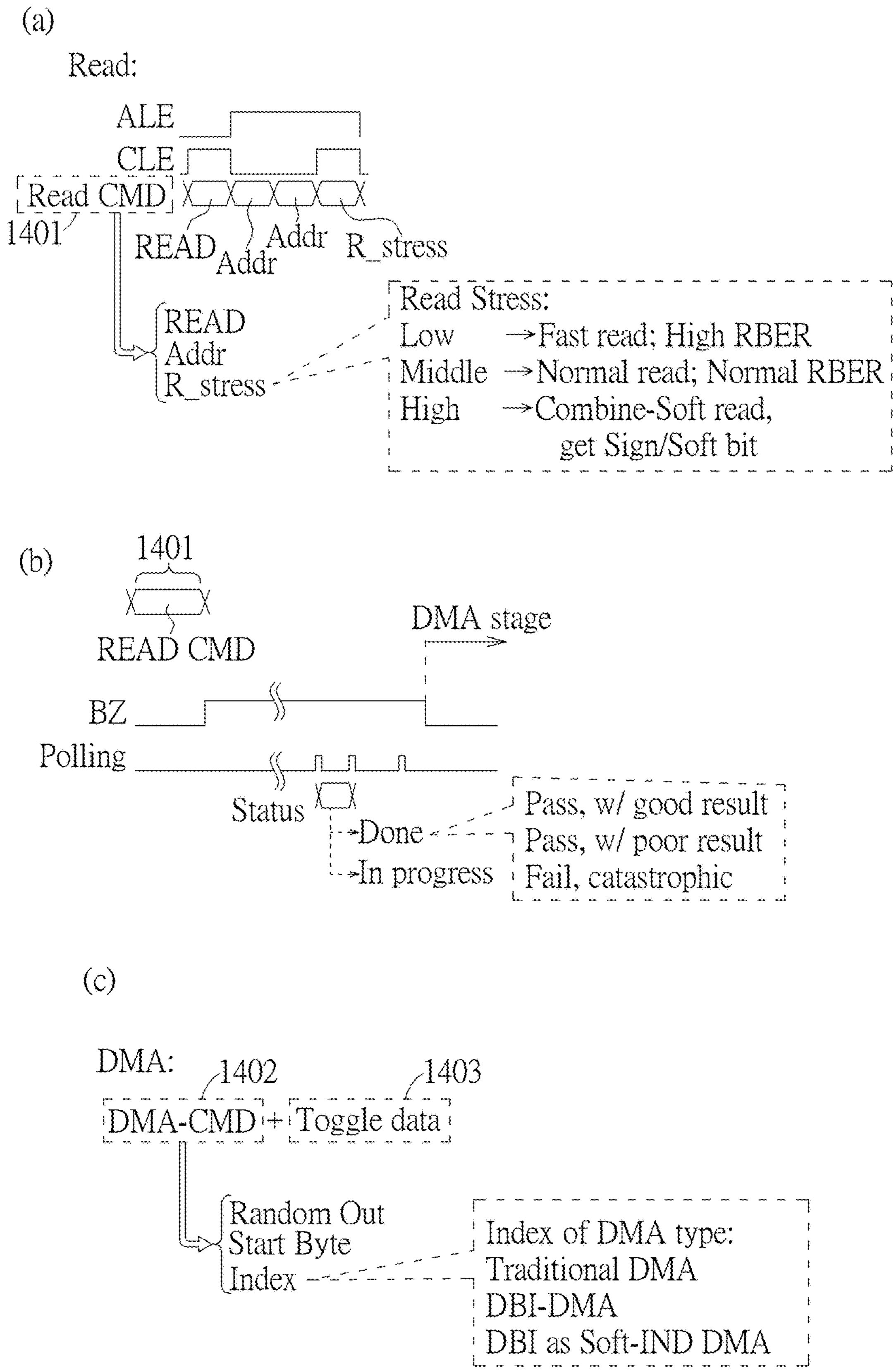
FIG. 14 illustrates a scenario regarding the enhanced soft-decoding control scheme shown in FIG. 7 and associated implementation details according to an embodiment of the present invention.

FIG. 14 illustrates a scenario regarding the enhanced soft-decoding control scheme shown in FIG. 7 and associated implementation details according to an embodiment of the present invention. As shown in the sub-diagram (a), taking a separate command and address format of the read command (CMD) 1401 as an example, when reading data from the flash memory module 120, the flash memory controller 110 may send the read command 1401, and more particularly, use the associated control signals such as the Command Latch Enable (CLE) signal and the Address Latch Enable (ALE) signal for indicating the read operating command READ and the addresses {Addr} to be latched on the input/output (I/O) terminals (e.g., the I/O terminals for transmitting the multiple data signals {DQ} such as the data signals DQ[7:0] during data transfer), respectively. In addition to original command elements such as the read operating command READ and the addresses {Addr} (e.g., the block address Addr_BLK and the page address Addr_PG), the read command 1401 may comprise a new command element such as the read stress R_stress, for indicating any level among multiple levels of stress regarding reading. For example, the multiple levels of stress may comprise low stress, middle stress and high stress (or "Low", "Middle" and "High" for brevity), for performing the Fast read with a first target RBER such as high RBER, the Normal read with a second target RBER such as normal RBER and the Combine-Soft read (based on the enhanced soft-decoding control scheme, to get the sign-bit and the soft-bit from the flash memory module 120), respectively. The read busy time (or "tR") may be normal or typical for the case of the middle stress, and may be shorter and longer for the cases of the low stress and the high stress, respectively. For better comprehension, the read stress R_stress may be illustrated as being latched on the I/O terminals when both of the CLE signal and the ALE signal are pulled high, but the present invention is not limited thereto. According to some embodiments, another control signal such as a Read-stress Latch Enable (RLE) signal dedicated to the read stress R_stress may be illustrated to have a pulse at the cycle of the read stress R_stress, with this pulse indicating that the read stress R_stress should be latched during the pulse, and both of the CLE signal and the ALE signal may be illustrated to kept low in this cycle by default.

As shown in the sub-diagram (b), after the flash memory controller 110 sends the read command 1401, the flash memory module 120 may enter the read busy state as indicated by the busy signal BZ at the high level thereof, and the flash memory controller 110 may perform polling operations on the flash memory module 120 with the pulses of the Polling signal, respectively, in order to obtain the latest status of the flash memory module 120, such as any status among the Done status and the In Progress status, which may indicating that the reading is done and that the reading is in progress, respectively. The Done status may comprise any sub-status among multiple sub-statuses such as the Pass status with good reading result (or "Pass, w/ good result") having no error or a few errors such as some errors which have been corrected, the Pass status with poor reading result (or "Pass, w/ poor result") having a certain amount of errors, and the Fail status with catastrophic reading result (or "Fail, catastrophic") having a large amount of errors. In addition, after the busy signal BZ transit to the low level thereof, the flash memory controller 110 may start performing DMA operations on the flash memory module 120 in a DMA stage.

As shown in the sub-diagram (c), in the DMA stage, when detecting that the latest status of the flash memory module 120 is the Done status, the flash memory controller 110 may perform the DMA operations on the flash memory module 120 (in particular, the internal buffer therein, which may comprise the data-byte buffer and the soft-byte buffer) by using the DMA command (or "DMA-CMD") 1402 plus Toggle Data operations 1403 for obtaining data from the flash memory module 120 via on the multiple data signals {DQ} such as the data signals DQ[7:0] on the data bus. In addition, multiple command elements of the DMA command 1402 may comprise a first command element such as the Random Data Out (or "Random Out") operating command, a second command element such as the Start Byte, and may further comprise a third command element such as an index regarding the type of DMA, for indicating any DMA type among multiple predetermined DMA types. For example, the multiple predetermined DMA types may comprise Types #1 and #2 corresponding to disabling the selective soft-bit transmission at the NV memory and Type #3 corresponding to enabling the selective soft-bit transmission at the NV memory as follows:

(Type #1) the Traditional DMA: the DMA without enabling the data-bus inversion function, for example, the DBI signal is not used, and the data bits on the data signals DQ[7:0] are not inverted;

(Type #2) the Data-Bus Inversion DMA (or "the DBI-DMA"): the DMA with the data-bus inversion function being enabled, where the DBI signal is used for specifying the byte with bit wise reversal to make more zeros in this bytes, and the data bits on the data signals DQ[7:0] may be selectively inverted as indicated by the DBI signal, for example, the high voltage level of the DBI signal may indicate that the data bits on the data signals DQ[7:0] have been inverted, and the low voltage level of the DBI signal may indicate that the data bits on the data signals DQ[7:0] have not been inverted; and (Type #3) the Data-Bus Inversion as Soft-Indicator/Indication DMA (or "the DBI as Soft-IND DMA"): the DMA with the DBI signal being used as the soft-bit indication, where the predetermined indication signal IND such as the DBI signal may be used for indicating whether there is the aforementioned any soft bit coming after the current data (or sign) bit on the aforementioned any data signal DQ among the multiple data signals {DQ} such as the data signals DQ[7:0], for example, as mentioned in the embodiment shown in FIG. 8;

where the controller-side indication IND_controller may be implemented with the index carried by the DMA command 1402.

When there is a need, after the power-up of the memory device 100, the flash memory controller 110 may send an after-power-up read command (or the immediately-after-power-up read command, sent after the power-up immediately) such as the read command 1401 carrying the read stress R_stress to the flash memory module 120, for determining whether to enable the selective soft-bit transmission at the flash memory module 120. For example, the read stress R_stress may be set as the high stress, rather than any of the low stress and middle stress. The flash memory controller 110 may perform at least one polling operation on the flash memory module 120 with at least one pulse of the Polling signal to obtain the latest status of the flash memory module 120, and determine, based on the latest status, whether to enable the selective soft-bit transmission at the flash memory module 120. Regarding the index carried by the DMA command 1402, if the latest status of the flash memory module 120 is the Pass status with good reading result, the flash memory controller 110 may set the index to indicate any type among Types #1 and #2, in order to perform the Traditional DMA or the DBI-DMA; and if the latest status of the flash memory module 120 is the Pass status with poor reading result, the flash memory controller 110 may set the index to indicate Type #3, in order to perform the DBI as Soft-IND DMA, for specifying the DBI signal for the soft-bit transfer. During performing the DBI as Soft-IND DMA, the flash memory controller 110 may apply the soft-bit DMA under the 1-sign, 1-soft arrangement, and more particularly, use the DBI bit (e.g., the bit indicated by the DBI signal) to specify that, after a current data (or sign) byte on the data signals DQ[7:0], the following byte is its soft-information (or soft byte), for example, as shown FIG. 8. It still allows the byte count to be correctly known as the data transfer length. Assuming that one chunk stored in the flash memory module 120 may comprise 4676 bytes such as the 4K580B mentioned above, the flash memory controller 110 may count the data (or sign) bytes D0 to D4676.

According to some embodiments, the flash memory controller 110 may send at least one read command, such as the second read command mentioned in Step S24 or the after-power-up read command, as well as the controller-side indication IND_controller, to the NV memory such as the flash memory module 120 for obtaining the soft-decoding information SDI (e.g., the soft-decoding information SDI(r) mentioned in Step S24, or any soft-decoding information SDI regarding any page within any block among the plurality of blocks), and receive the soft-decoding information SDI as well as the memory-side indication IND_memory from the NV memory such as the flash memory module 120, for performing the soft-decoding with the decoder such as the LDPC decoder according to the soft-decoding information SDI to obtain the data DATA (e.g., the data DATA(r) mentioned in Step S25, or any data DATA stored in the aforementioned any page) from the soft-decoding. In addition, any read command among the aforementioned at least one read command may be implemented with the read command 1401 to comprise the multiple command elements such as the read operating command READ, the aforementioned at least one address Addr and the read stress R_stress. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing data protection control of a memory device with aid of selective soft-bit transmission, the method being applicable to a memory controller of the memory device, the memory device comprising the memory controller and a non-volatile (NV) memory, the NV memory comprising at least one NV memory element, the at least one NV memory element comprising a plurality of blocks, the method comprising:

sending at least one read command as well as a controller-side indication, the controller-side indication for selectively enabling the selective soft-bit transmission at the NV memory, to the NV memory for obtaining soft-decoding information regarding a first page within a first block among the plurality of blocks, wherein the first page is arranged to store first data; and receiving the soft-decoding information as well as a memory-side indication from the NV memory, for performing soft-decoding according to the soft-decoding information to obtain the first data from the soft-decoding, wherein the memory-side indication at a first cycle is arranged to indicate whether the NV memory is going to transmit at least one soft bit at a second cycle, the second cycle coming after the first cycle.

2. The method of claim 1, wherein the at least one read command comprises a second read command; and the method further comprises:

receiving a first host read command from a host device, wherein the first host read command indicates reading first data at a first logical address; and in response to the first host read command, sending a first read command to the NV memory in order to try reading the first data from the first page according to a first physical address associated with the first logical address, wherein the first physical address indicates the first page within the first block, and reading the first data from the first page is unsuccessful;

wherein the second read command is sent to the NV memory in response to reading the first data from the first page being unsuccessful.

3. The method of claim 2, further comprising:

in response to the first host read command, performing address mapping on the first logical address according to at least one logical-to-physical (L2P) address mapping table to obtain the first physical address associated with the first logical address, wherein the at least one L2P address mapping table comprises mapping relationships between multiple logical addresses and multiple physical addresses, the first logical address is one of the multiple logical addresses, and the first physical address is one of the multiple physical addresses.

4. The method of claim 1, wherein the at least one read command comprises an after-power-up read command which is sent to the NV memory after a power-up of the memory device.

5. The method of claim 4, wherein after the power-up of the memory device, the memory controller is arranged to send the after-power-up read command to the NV memory, for determining whether to enable the selective soft-bit transmission at the NV memory.

6. The method of claim 5, wherein multiple command elements of the after-power-up read command comprise a read stress, for indicating any level among multiple levels of stress regarding reading, wherein the multiple levels of stress at least comprise low stress and high stress, and the read stress is set as the high stress, rather than the low stress; and the memory controller is arranged to perform at least one polling operation on the NV memory to obtain a latest status of the NV memory, and determine, based on the latest status, whether to enable the selective soft-bit transmission at the NV memory.

7. The method of claim 1, wherein any read command among the at least one read command comprises multiple command elements, and the multiple command elements comprise a read operating command and at least one address, and further comprise a read stress, for indicating any level among multiple levels of stress regarding reading.

8. The method of claim 7, wherein the multiple levels of stress at least comprise low stress and high stress.

9. The method of claim 1, wherein the memory controller is arranged to send a direct memory access (DMA) command, and multiple command elements of the DMA command comprise an index for indicating any DMA type among multiple predetermined DMA types, wherein the controller-side indication is implemented with the index carried by the DMA command.

10. The method of claim 9, wherein the multiple predetermined DMA types comprise one or more types corresponding to disabling the selective soft-bit transmission at the NV memory, and further comprise another type corresponding to enabling the selective soft-bit transmission at the NV memory.

11. The method of claim 1, wherein for any bit of the first data, the soft-decoding information corresponding to the any bit comprises a sign bit and at least one soft bit.

12. The method of claim 1, wherein the second cycle represents a next cycle of the first cycle, the next cycle next to the first cycle.

13. The method of claim 1, wherein receiving the soft-decoding information as well as the memory-side indication from the NV memory further comprises:

receiving the soft-decoding information and the memory-side indication from the NV memory via a set of data signals and a predetermined indication signal, respectively, wherein the set of data signals and the predetermined indication signal are arranged to carry the soft-decoding information and the memory-side indication, respectively.

14. The method of claim 13, wherein the set of data signals comprise multiple data signals corresponding to at least one byte for transmitting multiple bits of the at least one byte simultaneously.

15. The method of claim 13, wherein the predetermined indication signal represents an other-purpose signal which is originally used for at least one other purpose differing from a purpose of the selective soft-bit transmission, and the other-purpose signal is used as the predetermined indication signal in a situation where transmission for the at least one other purpose is not needed.

16. The method of claim 15, wherein regarding the at least one other purpose, the other-purpose signal is a data-bus inversion (DBI) signal for indicating whether data bits on the set of data signals have been inverted.

17. A memory controller, for performing enhanced data protection of a memory device with aid of selective soft-bit transmission, the memory device comprising the memory controller and a non-volatile (NV) memory, the NV memory comprising at least one NV memory element, the at least one NV memory element comprising a plurality of blocks, the memory controller comprising:

a processing circuit, arranged to control the memory controller according to a plurality of host commands from a host device, to allow the host device to access the NV memory through the memory controller;

wherein:

the memory controller is arranged to send at least one read command as well as a controller-side indication, the controller-side indication for selectively enabling the selective soft-bit transmission at the NV memory, to the NV memory for obtaining soft-decoding information regarding a first page within a first block among the plurality of blocks, wherein the first page is arranged to store first data; and the memory controller is arranged to receive the soft-decoding information as well as a memory-side indication from the NV memory, for performing soft-decoding according to the soft-decoding information to obtain the first data from the soft-decoding, wherein the memory-side indication at a first cycle is arranged to indicate whether the NV memory is going to transmit at least one soft bit at a second cycle, the second cycle coming after the first cycle.

18. The memory device comprising the memory controller of claim 17, wherein the memory device comprises:

the NV memory, configured to store information; and the memory controller, coupled to the NV memory, configured to control operations of the memory device.

19. The electronic device comprising the memory device of claim 18, and further comprising:

the host device, coupled to the memory device, wherein the host device comprises:

at least one processor, arranged for controlling operations of the host device; and a power supply circuit, coupled to the at least one processor, arranged for providing power to the at least one processor and the memory device;

wherein the memory device provides the host device with storage space.

* * * * *